(12) United States Patent
Shu et al.

(10) Patent No.: US 11,494,446 B2
(45) Date of Patent: Nov. 8, 2022

(54) METHOD AND APPARATUS FOR COLLECTING, DETECTING AND VISUALIZING FAKE NEWS

(71) Applicant: Arizona Board of Regents on Behalf of Arizona State University, Scottsdale, AZ (US)

(72) Inventors: Kai Shu, Mesa, AZ (US); Deepak Mahudeswaran, Tempe, AZ (US); Huan Liu, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 103 days.

(21) Appl. No.: 17/018,877

(22) Filed: Sep. 11, 2020

(65) Prior Publication Data

US 2021/0089579 A1    Mar. 25, 2021

Related U.S. Application Data

(60) Provisional application No. 62/904,556, filed on Sep. 23, 2019.

(51) Int. Cl.
*G06F 16/906* (2019.01)
*G06F 16/9035* (2019.01)
(Continued)

(52) U.S. Cl.
CPC ........ *G06F 16/906* (2019.01); *G06F 16/9035* (2019.01); *G06F 16/90332* (2019.01);
(Continued)

(58) Field of Classification Search
CPC ............. G06F 16/906; G06F 16/90332; G06F 16/90335; G06F 16/9035; G06F 16/951;
(Continued)

(56) References Cited

U.S. PATENT DOCUMENTS 9,378,200 B1    6/2016  Cohen et al.
9,544,381 B2    1/2017  Zafarani et al.
(Continued)

FOREIGN PATENT DOCUMENTS

WO    2020061578 A1    3/2020

OTHER PUBLICATIONS

Kwon, Sejeong, et al. "Prominent features of rumor propagation in online social media." (2013) IEEE 13th international conference on data mining. IEEE. (Year: 2013).*
(Continued)

*Primary Examiner* — William B Partridge
*Assistant Examiner* — Lana Alagic
(74) *Attorney, Agent, or Firm* — Elliott, Ostrander & Preston, P.C.

(57) ABSTRACT

Detecting fake news involves analyzing a distribution of publishers who publish many news articles, analyzing a distribution of various topics relating to the published news articles, analyzing a social media context relating to the published news articles, and detecting fake news articles among the news articles based on the analysis of the distribution of publishers, the analysis of the distribution of the various topics, and the analysis of the social media context. Detecting fake news alternatively involves receiving online news articles including both fake online news articles and real online news articles, creating a hierarchical macro-level propagation network of the fake online news and real online news articles, the hierarchical macro-level propagation network comprising news nodes, social media post nodes, and social media repost nodes, creating a hierarchical micro-level propagation network of the fake online news and real online news articles, the hierarchical micro-level propagation network comprising reply nodes, analyzing structural and temporal features of the hierarchical
(Continued)

macro-level propagation network, analyzing structural, temporal, and linguistic features of the hierarchical micro-level propagation network, and identifying fake news among the online news articles based on the analysis of the structural and temporal features of the hierarchical macro-level propagation network and the analysis of the structural, temporal, and linguistic features of the hierarchical micro-level propagation network.

21 Claims, 33 Drawing Sheets

(51) Int. Cl.
| | |
|---|---|
| G06F 16/903 | (2019.01) |
| G06F 16/951 | (2019.01) |
| H04L 51/02 | (2022.01) |
| G06F 16/9032 | (2019.01) |
| H04L 51/52 | (2022.01) |

(52) U.S. Cl.
CPC ...... *G06F 16/90335* (2019.01); *G06F 16/951* (2019.01); *H04L 51/02* (2013.01); *H04L 51/52* (2022.05)

(58) Field of Classification Search
CPC ...... G06F 16/90; G06F 16/903; G06F 16/953; G06F 16/9532; G06F 16/9538; H04L 51/02; H04L 51/32; H04L 51/52; H04L 51/222; G06N 3/02; G06N 3/10; G06N 3/105
See application file for complete search history.

(56) References Cited

U.S. PATENT DOCUMENTS

| | | | |
|---|---|---|---|
| 10,127,304 B1 | 11/2018 | Cohen et al. | |
| 10,534,983 B1 | 1/2020 | Tung et al. | |
| 10,628,467 B2 | 4/2020 | Bergs et al. | |
| 10,664,764 B2 | 5/2020 | Gundecha et al. | |
| 10,942,939 B2 | 3/2021 | Li et al. | |
| 2009/0157490 A1* | 6/2009 | Lawyer | G06F 16/958 707/999.005 |
| 2015/0248736 A1 | 9/2015 | Myslinski | |
| 2016/0063053 A1* | 3/2016 | Myslinski | G06F 16/248 705/329 |
| 2016/0321260 A1* | 11/2016 | Owens | G06F 16/958 |
| 2016/0328482 A1 | 11/2016 | Shah et al. | |
| 2017/0139921 A1 | 5/2017 | Ball et al. | |
| 2017/0195125 A1* | 7/2017 | Heppe | H04L 63/123 |
| 2017/0213153 A1 | 7/2017 | Wang et al. | |
| 2018/0018709 A1 | 1/2018 | Sela et al. | |
| 2019/0379628 A1 | 12/2019 | Wu et al. | |
| 2020/0004882 A1* | 1/2020 | Kulkarni | G06F 17/18 |
| 2020/0019840 A1 | 1/2020 | Guo et al. | |
| 2020/0065292 A1 | 2/2020 | Li et al. | |
| 2021/0089579 A1 | 3/2021 | Shu et al. | |
| 2021/0272217 A1 | 9/2021 | Shu et al. | |
| 2021/0279369 A1 | 9/2021 | Beigi et al. | |
| 2021/0334908 A1 | 10/2021 | Shu et al. | |

OTHER PUBLICATIONS

Jin, Zhiwei, et al. "News credibility evaluation on microblog with a hierarchical propagation model." (2014) 2014 IEEE international conference on data mining. IEEE. (Year: 2014).*
Shu, Kai, et al. "Fake news detection on social media: A data mining perspective." (2017) ACM SIGKDD explorations newsletter 19.1: 22-36. (Year: 2017).*
Allcott, H., et al., "Social media and fake news in the 2016 election," Technical report, National Bureau of Economic Research, 2017, pp. 211-236.
Babcock, M., et al., "Which fake fits? How the diffusion of disinformation varies by campaign type and community in the 'Black Panther' Twitter discussion", 2018, 2 pages.
Baccianella, S, et al., "Sentiwordnet 3.0: an enhanced lexical resource for sentiment analysis and opinion mining", Proceedings of the Seventh International Conference on Language Resources and Evaluation (LREC'10), 2010, pp. 2200-2204.
Bovet, A., et al., "Influence of fake news in twitter during the 2016 us presidential election" (2018), arXiv preprint arXiv:1803.08491, 14 pages.
Castillo, C, et al., "Characterizing the life cycle of online news stories using social media reactions," In Proceedings of the 17th ACM conference on Computer supported cooperative work & social computing (CSCW'14). Association for Computing Machinery, 2014, pp. 211-223.
Castillo, C, et al., "Information credibility on twitter," in Proceedings of the 20th international conference on World wide web, pp. 675-684. ACM (2011).
Chen, Y, et al., "Misleading online content: Recognizing clickbait as false news," (2015) in Proceedings of the 2015 ACM on Workshop on Multimodal Deception Detection, pp. 15-19. ACM.
Davis, C.A., et al., "Botornot: A system to evaluate social bots," in WWW'16, 2 pages.
Del Vicario, M, et al., "Echo chambers: Emotional contagion and group polarization on facebook," (2016) Scientific reports 6:37825, 12 pages.
Farajtabar, M, et al., "Fake news mitigation via point process based intervention," (2017) arXiv preprint arXiv:1703.07823, 10 pages.
Final Office Action for U.S. Appl. No. 17/267,765, dated Apr. 20, 2022, 20 pages.
Goel, S, et al., "The structural virality of online diffusion," (2015) Management Science 62(1):pp. 180-196.
Gupta, A., et al., "Faking sandy: characterizing and identifying fake images on twitter during hurricane sandy," In WWW'13, 8 pages.
Hosseinimotlagh, S., et al., "Unsupervised content based identification of fake news articles with tensor decomposition ensembles," (2018), 8 pages.
Hutto, C.J., et al., "Vader: A parsimonious rule-based model for sentiment analysis of social media text" (2014), 10 pages.
Ji, Y., et al., "Representation learning for text-level discourse parsing," (2014) in ACL'2014, vol. 1, pp. 13-24.
Jin, Z., et al., "News verification by exploiting conflicting social viewpoints in microblogs," (2016) in AAAI, pp. 2972-2978.
Kim, A., et al., "Says who?: How news presentation format influences perceived believability and the engagement level of social media users" (2017), 11 pages.
Kwon, S, et al., "Prominent features of rumor propagation in online social media," (2013) in ICDM'13, pp. 1103-1108. IEEE.
Liu, Y., et al., "Early detection of fake news on social media through propagation path classification with recurrent and convolutional networks," (2018) in Thirty-Second AAAI Conference on Artificial Intelligence, 8 pages.
Magdy, A., et al., "Web-based statistical fact checking of textual documents," (2010) in Proceedings of the 2nd international workshop on Search and mining user-generated contents, pp. 103-110. ACM.
Manning, C, et al., "The Stanford corenlp natural language processing toolkit," (2014) in ACL'14, pp. 55-60.
Mitra, T., et al., "Credbank: A large-scale social media corpus with associated credibility annotations," in ICWSM'15, 10 pages.
Mohammad, S., et al., "Stance and sentiment in tweets," (2017) ACM Transactions on Internet Technology (TOIT) 17(3):26, 23 pages.
Non-final Office Action for U.S. Appl. No. 17/267,765, dated Sep. 8, 2021, 32 pages.
Pedregosa, F., et al., "Scikit-learn: Machine learning in python," (2011) JMLR 12(Oct.):2825-2830.
Pennebaker, J.W., et al., "The development and psychometric properties of LIWC2015," (2015) Technical report, 26 pages.
Potthast, M, et al., "A stylometric inquiry into hyperpartisan and fake news," (2017) arXiv preprint arXiv:1702.05638, 10 pages.
Qazvinian, V, et al., "Rumor has it: Identifying misinformation in microblogs," in EMNLP'11, 11 pages.

(56) References Cited

OTHER PUBLICATIONS

Qian, F, et al., "Neural user response generator: Fake news detection with collective user intelligence," in IJCAI'18, 7 pages.
Rubin, V. L., et al., "Truth and deception at the rhetorical structure level," (2015) Journal of the Association for Information Science and Technology 66(5):905-917.
Ruchansky, N., et al., "CSI: A hybrid deep model for fake news detection," (2017) In CIKM, pp. 797-806, ACM.
Santia, G.C., et al., "Buzzface: A news veracity dataset with facebook user commentary and egos," in ICWSM'18, 10 pages.
Shao, C, et al., "The spread of fake news by social bots," (2017) arXiv preprint arXiv:1707.07592v1 (Jul. 24, 2017), 16 pages.
Shao, C, et al., "The spread of fake news by social bots," (2017) arXiv preprint arXiv:1707.07592v2 (Sep. 26, 2017), 16 pages.
Shao, C, et al., "The spread of information by social bots," (2017) arXiv preprint arXiv:1707.07592v3 (Dec. 30, 2017), 27 pages.
Shao, C. et al., "Hoaxy: A Platform for Tracking Online Misinformation," WWW'16 Companion: Proceedings of the 25th International Conference Companion on World Wide Web, 2016, 6 pages.
Shao, C., et al., "The spread of low-credibility content by social bots," arXiv preprint arXiv:1707.07592v4 (May 24, 2018), 41 pages.
Shu, K, et al., "Beyond news contents: The role of social context for fake news detection," in WSDM'19, 9 pages.
Shu, K, et al., "Deep headline generation for clickbait detection," in ICDM'18, 10 pages.
Shu, K, et al., "Fake news detection on social media: A data mining perspective," (2017) SIGKDD exploration newsletter, 15 pages.
Shu, K, et al., "Fakenewstracker: a tool for fake news collection, detection, and visualization," Computational and Mathematical Organization Theory, 2018, pp. 60-71.
Shu, K, et al., "Studying fake news via network analysis: Detection and mitigation," (2018) CoRR abs/1804.10233, 22 pages.
Shu, K, et al., "Understanding user profiles on social media for fake news detection," (2018) in 2018 IEEE Conference on Multimedia Information Processing and Retrieval (MIPR), 7 pages.
Shu, K., et al., "FakeNewsNet: A Data Repository with News Content, Social Context and Spatiotemporal Information for Studying Fake News on Social Media," Association for the Advancement of Artificial Intelligence (https://arxiv.org/pdf/1809.01286.pdf), (Mar. 27, 2019), 11 pages.
Shu, K., et al., "Hierarchical Propagation Networks for Fake News Detection: Investigation and Exploitation," Proceedings of the International AAAI Conference on Web and Social Media, 2020, 14(1), 626-637.
Swift, A., "Americans trust in mass media sinks to new low," 2016, 8 pages, obtained from https://news.gallup.com/poll/195542/americans-trust-mass-media-sinks-new-low.aspx on Dec. 13, 2021.
Tacchini, E, et al., "Some like it hoax: Automated fake news detection in social networks," (2017) arXiv preprint arXiv:1704.07506, 12 pages.
Vosoughi, S, et al., "The spread of true and false news online," (2018) Science 359(6380):1146-1151.
Wang, S, et al., "Cure or Poison? Identity Verification and the Spread of Fake News on Social Media," Fox School of Business Research Paper No. 18-040, 2018, 41 pages, available at SSRN: https://ssrn.com/abstract=3249479 or http://dx.doi.org/10.2139/ssrn.3249479.
Wang, W. Y., "'Liar, Liar Pants on Fire': A New Benchmark Dataset for Fake News Detection," (2017) preprint arXiv:1705.00648, 5 pages.
Written Opinion and Search Report for International Application No. PCT/US2019/52495 dated Dec. 6, 2019, 8 pages.
Wu, L, et al., "Tracing fake-news footprints: Characterizing social media messages by how they propagate," (2018) in WSDM, pp. 637-645. ACM.
Wu, Y, et al., "Toward computational fact-checking," (2014) Proceedings of the VLDB Endowment 7(7): pp. 589-600.
Yang, S, et al., "Unsupervised fake news detection on social media: A generative approach," in AAAI'19, pp. 5644-5651.
Zubiaga, A, et al., "Towards real-time, country-level location classification of worldwide tweets," TKDE'17, pp. 2053-2066.

* cited by examiner

| Dataset/ Features | PolitiFact | | GossipCop | |
|---|---|---|---|---|
| | Fake | Real | Fake | Real |
| Total news articles | 432 | 624 | 6,048 | 16,817 |
| News articles with text content | 353 | 400 | 785 | 16,765 |
| News articles with social engagements | 342 | 314 | 4,298 | 82,902 |
| News articles with both social engagement and news content | 286 | 202 | 675 | 2,895 |
| News articles with social engagement containing at least 1 reply | 236 | 180 | 945 | 752 |
| News articles with social engagement containing at least 1 like | 283 | 219 | 2,911 | 845 |
| News articles with social engagements containing at least 1 retweet | 282 | 242 | 2,249 | 1,254 |
| No. of tweets with replies | 6,686 | 20,720 | 3,040 | 2,546 |
| No. of tweets with likes | 18,453 | 52,082 | 10,685 | 2,264 |
| No. of tweets with retweets | 13,226 | 42,059 | 7,614 | 5,025 |
| Total no. of tweets | 116,005 | 261,262 | 71,009 | 154,383 |

FIG. 2

| Features | News Content | | Social Context | | | | Spatiotemporal Information | |
|---|---|---|---|---|---|---|---|---|
| Dataset | Linguistic | Visual | User | Post | Response | Network | Spatial | Temporal |
| BuzzFeedNews | ✓ | | | | | | | |
| LIAR | ✓ | | | | | | | |
| BS Detector | ✓ | | | | | | | |
| CREDBANK | ✓ | | ✓ | ✓ | | | ✓ | |
| BuzzFace | ✓ | | ✓ | ✓ | ✓ | | | |
| FacebookHoax | ✓ | | ✓ | ✓ | ✓ | | | |
| FakeNewsNet | ✓ | ✓ | | | | ✓ | ✓ | ✓ |

FIG. 4

| Category | | Features | PolitiFact | | GossipCop | |
|---|---|---|---|---|---|---|
| | | | Fake | Real | Fake | Real |
| News Content | Linguistic | # News articles | 432 | 624 | 5,323 | 16,187 |
| | | # News articles with text | 420 | 528 | 4,947 | 16,694 |
| | Visual | # News articles with images | 336 | 447 | 1,650 | 16,767 |
| | User | # Users Posting tweets | 95,553 | 249,887 | 265,155 | 80,137 |
| | | # Users involved in likes | 113,473 | 401,363 | 348,852 | 145,078 |
| | | # Users involved in retweets | 106,195 | 346,459 | 239,483 | 118,894 |
| | | # Users involved in replies | 40,585 | 186,675 | 106,325 | 50,799 |
| Social Context | Post | # Tweets Posting news | 164,892 | 399,237 | 519,581 | 876,967 |
| | Response | # Tweets with replies | 11,975 | 41,852 | 39,717 | 11,912 |
| | | # Tweets with likes | 31,692 | 93,839 | 96,906 | 41,889 |
| | | # Tweets with retweets | 23,489 | 67,035 | 56,552 | 24,955 |
| | Network | # Followers | 405,509,460 | 1,012,218,640 | 630,231,413 | 293,001,487 |
| | | # Followees | 449,463,557 | 1,071,492,603 | 619,207,586 | 308,428,225 |
| | | Average # followers | 1299.98 | 982.67 | 1020.99 | 933.64 |
| | | Average # followees | 1440.89 | 1040.21 | 1003.14 | 982.80 |
| Spatiotemporal Information | Spatial | # User profiles with locations | 217,379 | 719,331 | 429,547 | 220,264 |
| | | # Tweets with locations | 3,337 | 12,692 | 12,286 | 2,451 |
| | Temporal | # Timestamps for news pieces | 296 | 167 | 3,558 | 9,119 |
| | | # Timestamps for response | 171,301 | 669,641 | 381,600 | 200,531 |

FIG. 7

(a) PolitiFact Fake News (b) PolitiFact Real News (c) GossipCop Fake News (d) GossipCop Real News

FIG. 8

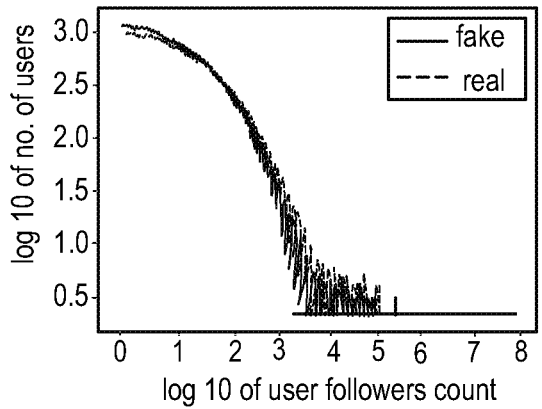
(a) Follower count of users in PolitiFact dataset
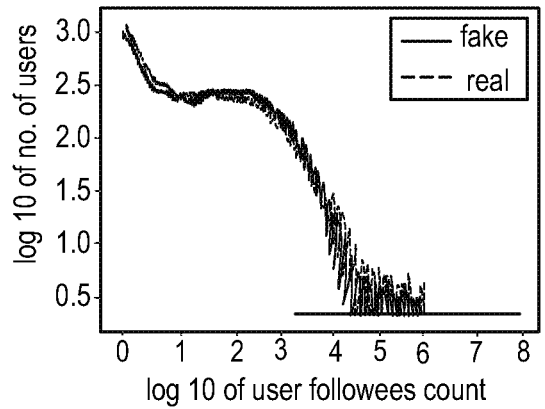
(b) Followee count of users in PolitiFact dataset
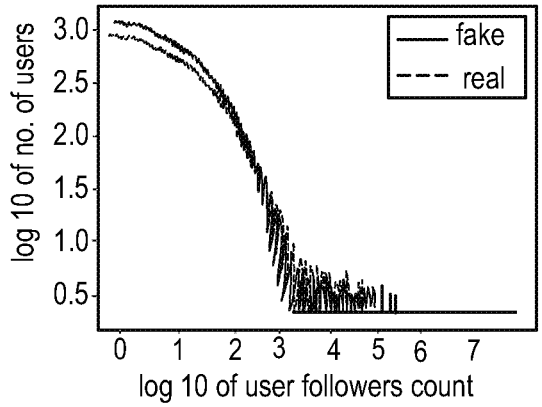
(c) Follower count of users in PolitiFact dataset
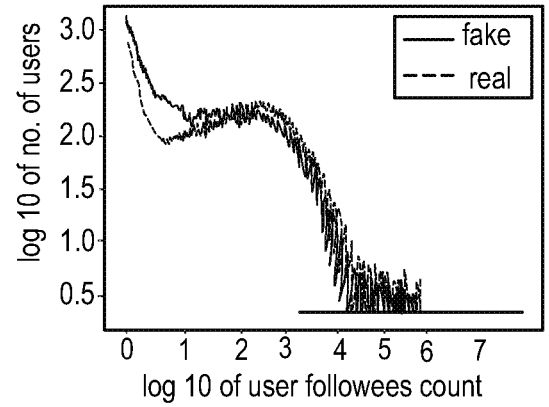
(d) Followee count of users in GossipCop dataset
FIG. 13

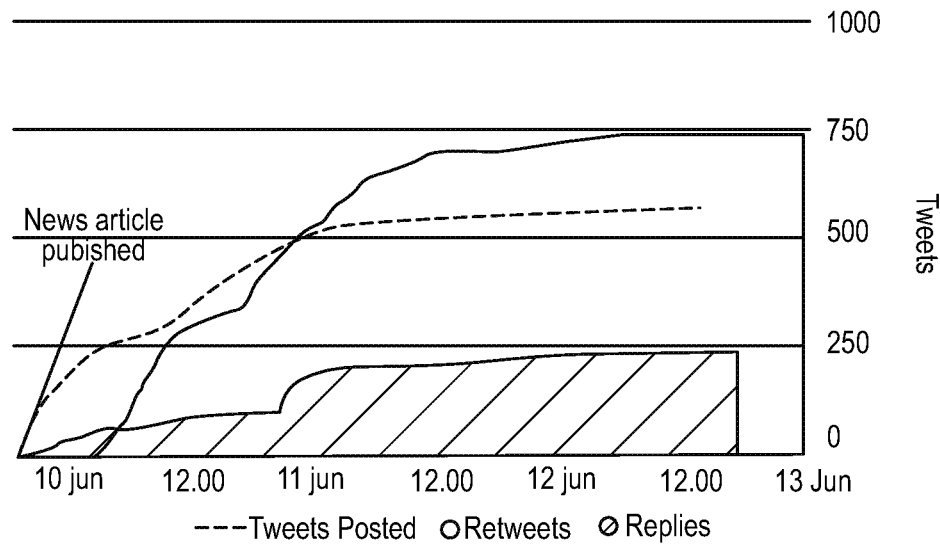
(a) Temporal user engagements of fake news
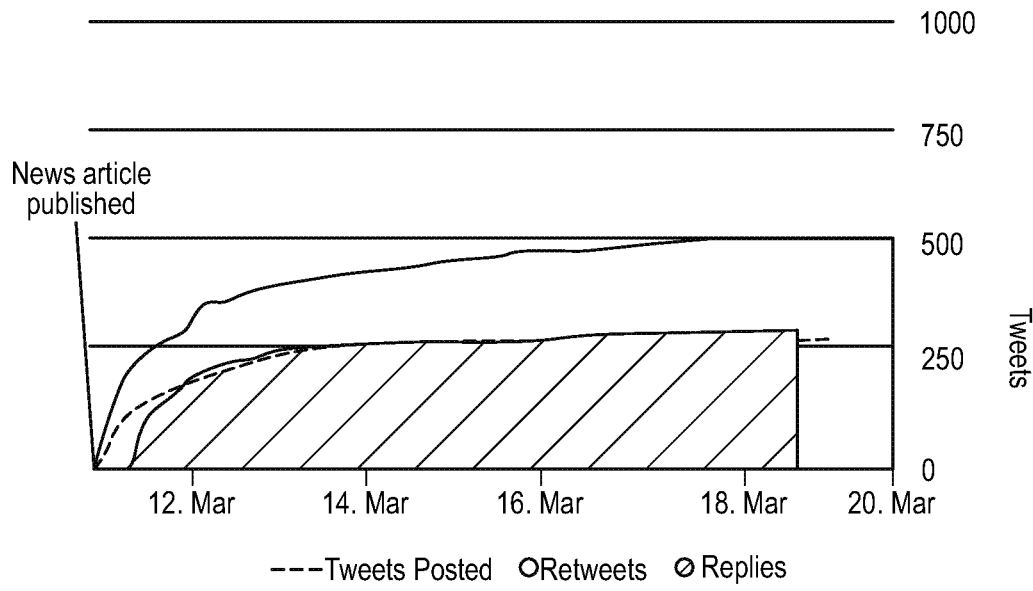
(b) Temporal user engagements of real news
FIG. 14

(a) Spatial distribution of users posting fake news
(b) Spatial distribution of users posting real news
FIG. 15

| Model | PolitiFact | | | | GossipCop | | | |
|---|---|---|---|---|---|---|---|---|
| | Accuracy | Precision | Recall | F1 | Accuracy | Precision | Recall | F1 |
| SVM | 0.580 | 0.611 | 0.717 | 0.659 | 0.497 | 0.511 | 0.713 | 0.595 |
| Logistic regression | 0.642 | 0.757 | 0.543 | 0.633 | 0.648 | 0.675 | 0.619 | 0.646 |
| Naive Bayes | 0.617 | 0.674 | 0.630 | 0.651 | 0.624 | 0.631 | 0.669 | 0.649 |
| CNN | 0.629 | 0.807 | 0.456 | 0.583 | 0.723 | 0.751 | 0.701 | 0.725 |
| Social Article Fusion/S | 0.654 | 0.600 | 0.789 | 0.681 | 0.689 | 0.671 | 0.738 | 0.703 |
| Social Article Fusion/A | 0.667 | 0.667 | 0.579 | 0.619 | 0.635 | 0.589 | 0.882 | 0.706 |
| Social Article Fusion | 0.691 | 0.638 | 0.789 | 0.706 | 0.689 | 0.656 | 0.792 | 0.717 |

FIG. 16

| Platform | PolitiFact | GossipCop |
|---|---|---|
| # True news | 624 | 16,817 |
| # Fake news | 432 | 5,323 |
| # True news with Propagation network | 277 | 6,945 |
| # Fake news with Propagation network | 351 | 3,684 |
| # Users | 384,813 | 739,166 |
| # Tweets | 275,058 | 1,058,330 |
| # Retweets | 293,438 | 530,833 |
| # Replies | 125,654 | 232,923 |

FIG. 19

| Features | PolitiFact | | | | | | GossipCop | | | | | |
|---|---|---|---|---|---|---|---|---|---|---|---|---|
| | Fake | | | Real | | | Fake | | | Real | | |
| | Min | Max | Avg | Min | Max | Avg | Min | Max | Avg | Min | Max | Avg |
| S1 | 2 | 14 | 5.93* | 2 | 13 | 5.49* | 2 | 12 | 3.89* | 2 | 10 | 3.43* |
| S2 | 2 | 35,189 | 774.65* | 2 | 23,494 | 1,205.46* | 2 | 5,339 | 272.14* | 2 | 2,497 | 108.76* |
| S3 | 0 | 145 | 27.37 | 0 | 95 | 31.35 | 0 | 198 | 14.42* | 0 | 98 | 12.44* |
| S4 | 1 | 17,548 | 415.59 | 1 | 9,577 | 537.0 | 1 | 2,568 | 158.67* | 1 | 1,625 | 80.19* |
| S5 | 0 | 7 | 1.17* | 0 | 5 | 1.03* | 0 | 4 | 1.15* | 0 | 6 | 0.94* |
| S6 | 0 | 3,207 | 56.79 | 0 | 1,640 | 84.55 | 0 | 421 | 18.57* | 0 | 241 | 3.58* |
| S7 | 0 | 1 | 0.16* | 0 | 1 | 0.08* | 0 | 1 | 0.15* | 0 | 1 | 0.05* |
| S8 | 0 | 2,462 | 63.26 | 0 | 1,735 | 77.05 | 0 | 461 | 12.86* | 0 | 125 | 3.37* |
| S9 | 0.01 | 0.68 | 0.23 | 0.03 | 0.8 | 0.21 | 0.01 | 0.89 | 0.29* | 0.01 | 0,97 | 0.32* |

FIG. 20

| Features | PolitiFact | | | | | | | GossipCop | | | | | | |
|---|---|---|---|---|---|---|---|---|---|---|---|---|---|
| | Fake | | | Real | | | | Fake | | | Real | | |
| | Min | Max | Avg | Min | Max | Avg | | Min | Max | Avg | Min | Max | Avg |
| S10 | 2 | 6 | 4.57* | 2 | 6 | 4.25* | | 2 | 6 | 3.40* | 2 | 6 | 2.51* |
| S11 | 2 | 21,923 | 544.91* | 2 | 18,522 | 853.89* | | 2 | 3,453 | 213.97* | 2 | 1,696 | 90.75* |
| S12 | 0 | 204 | 24.29 | 0 | 210 | 28.45 | | 0 | 234 | 9.82 | 0 | 191 | 4.54 |
| S13 | 0 | 1,089 | 26.29* | 0 | 1,185 | 45.33* | | 0 | 401 | 12.36* | 0 | 145 | 1.64* |
| S14 | 0 | 1 | 0.09* | 0 | 1 | 0.06* | | 0 | 1 | 0.06* | 0 | 1 | 0.02* |

FIG. 21

| Features | PolitiFact | | | | | | | GossipCop | | | | | |
|---|---|---|---|---|---|---|---|---|---|---|---|---|---|
| | Fake | | | Real | | | | Fake | | | Real | | |
| | Min | Max | Avg | Min | Max | Avg | | Min | Max | Avg | Min | Max | Avg |
| $L_1$ | 0.0 | 6.0 | 1.12 | 0.0 | 15.0 | 1.305 | | 0.0 | 23.5 | 1.094* | 0.0 | 20.0 | 1.010* |
| $L_2$ | -0.772 | 0.855 | 0.007* | -0.585 | 0.894 | 0.045* | | -0.961 | 0.9607 | 0.051* | -0.922 | 0.969 | 0.077* |
| $L_3$ | -0.693 | 0.855 | -0.001* | -0.885 | 0.894 | 0.0428* | | -0.961 | 0.961 | 0.046* | -0.921 | 0.969 | 0.074* |
| $L_4$ | -0.811 | 0.879 | 0.0156 | -0.934 | 0.664 | 0.027 | | -0.960 | 0.938 | 0.044* | -0.893 | 0.969 | 0.066* |
| $L_5$ | -0.811 | 0.879 | 0.011 | -0.934 | 0.851 | 0.028 | | -0.961 | 0.993 | 0.039* | -0.896 | 0.969 | 0.062* |

FIG. 23

| Datasets | Metric | RST | LIWC | STFN | HPNF | RST_HPNF | LIWC_HPNF | STNF_HPNF |
|---|---|---|---|---|---|---|---|---|
| PolitiFact | Accuracy | 0.796 | 0.830 | 0.649 | 0.843 | 0.875 | 0.872 | 0.856 |
|  | Precision | 0.821 | 0.855 | 0.605 | 0.835 | 0.873 | 0.869 | 0.809 |
|  | Recall | 0.752 | 0.792 | 0.836 | 0.851 | 0.876 | 0.872 | 0.927 |
|  | F1 | 0.785 | 0.822 | 0.702 | 0.843 | 0.875 | 0.871 | 0.864 |
| GossipCop | Accuracy | 0.600 | 0.725 | 0.796 | 0.861 | 0.861 | 0.869 | 0.863 |
|  | Precision | 0.603 | 0.773 | 0.812 | 0.854 | 0.850 | 0.856 | 0.857 |
|  | Recall | 0.586 | 0.637 | 0.770 | 0.869 | 0.876 | 0.887 | 0.871 |
|  | F1 | 0.594 | 0.698 | 0.791 | 0.862 | 0.863 | 0.871 | 0.864 |

FIG. 24

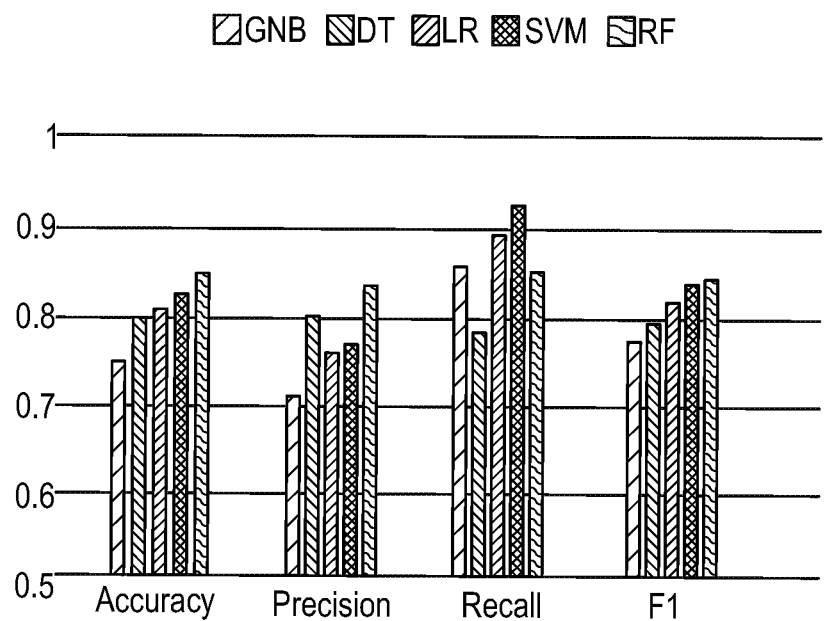
(a) PolitiFact dataset
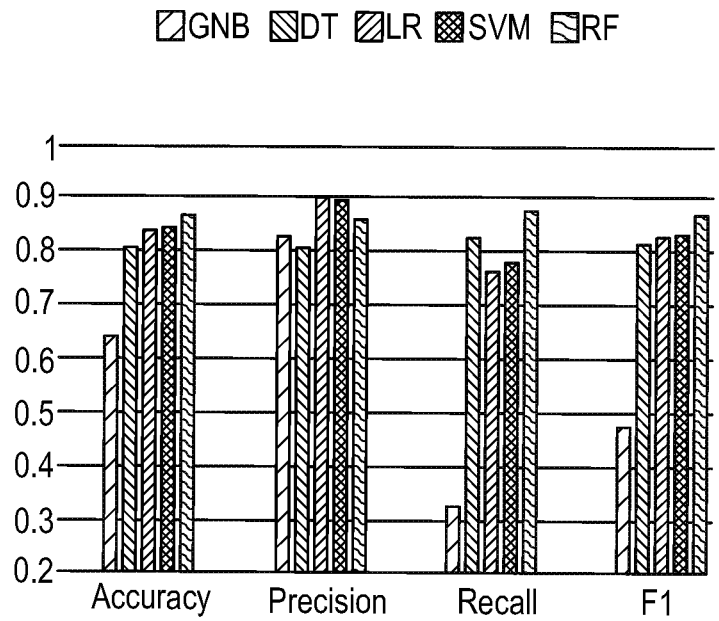
(b) GossipCop dataset
FIG. 25

| Datasets | Level | Acc | Prec | Rec | F1 |
|---|---|---|---|---|---|
| PolitiFact | Micro | 0.834 | 0.823 | 0.847 | 0.835 |
| | Macro | 0.807 | 0.816 | 0.789 | 0.802 |
| | All | 0.843 | 0.835 | 0.851 | 0.843 |
| GossipCop | Micro | 0.843 | 0.841 | 0.845 | 0.843 |
| | Macro | 0.852 | 0.841 | 0.868 | 0.854 |
| | All | 0.861 | 0.854 | 0.869 | 0.862 |

| Datasets | Type | Acc | Prec | Rec | F1 |
|---|---|---|---|---|---|
| PolitiFact | Structural | 0.681 | 0.681 | 0.672 | 0.676 |
| | Temporal | 0.793 | 0.716 | 0.963 | 0.821 |
| | Linguistic | 0.659 | 0.648 | 0.683 | 0.665 |
| | All | 0.843 | 0.835 | 0.851 | 0.843 |
| GossipCop | Structural | 0.826 | 0.828 | 0.823 | 0.826 |
| | Temporal | 0.826 | 0.827 | 0.825 | 0.826 |
| | Linguistic | 0.578 | 0.594 | 0.491 | 0.538 |
| | All | 0.861 | 0.854 | 0.869 | 0.862 |

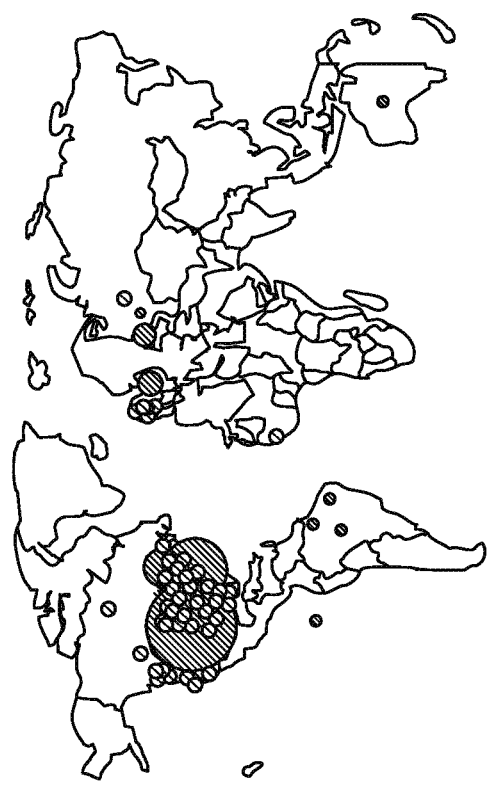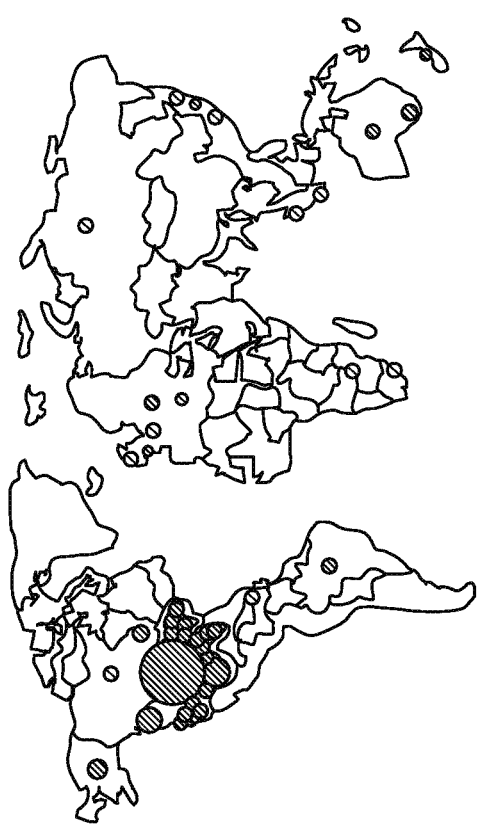
FIG. 31

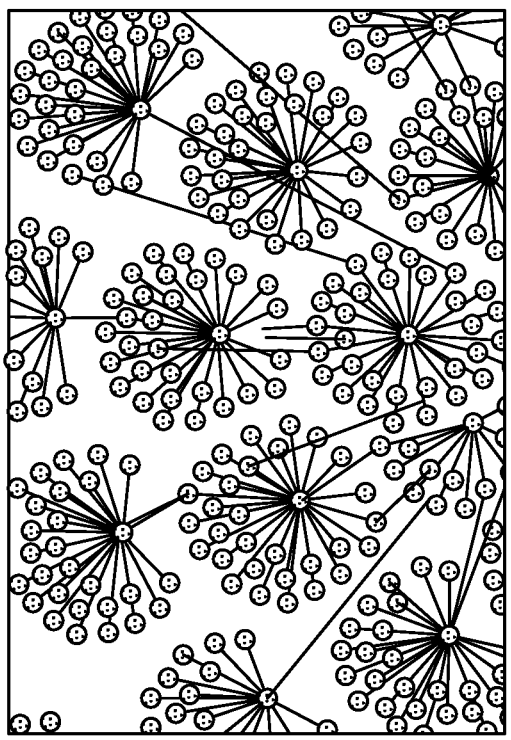
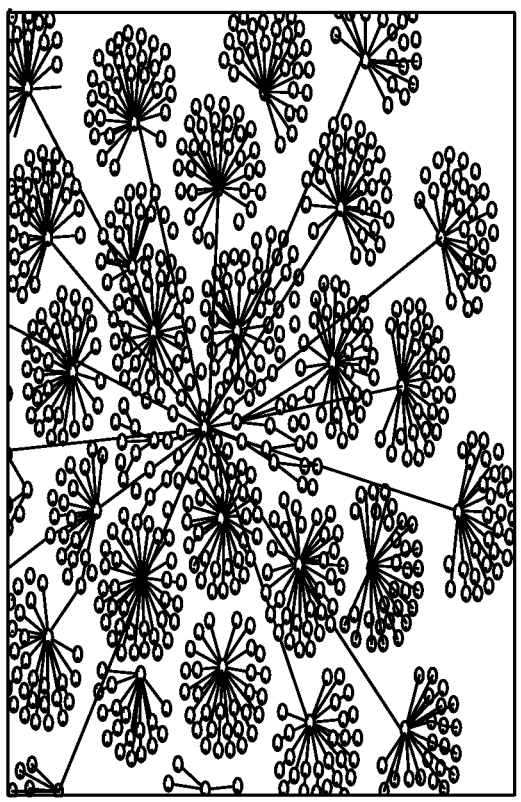
FIG. 32

METHOD AND APPARATUS FOR COLLECTING, DETECTING AND VISUALIZING FAKE NEWS

CROSS-REFERENCE TO RELATED APPLICATIONS

This non-provisional U.S. Utility patent application is related to, and claims priority to, provisional patent application No. 62/904,556, filed Sep. 23, 2019, entitled "Method and Apparatus for Collecting, Detecting and Visualizing Fake News", the contents of which are incorporated herein by reference, and is related to, and claims priority to, provisional patent application No. 62/904,558 filed Sep. 23, 2019, entitled "Method and Apparatus for Collecting, Detecting and Visualizing Fake News", the contents of which are incorporated herein by reference, and is related to international patent application number PCT/US19/52495, filed Sep. 23, 2019, entitled "Method and Apparatus for Collecting, Detecting and Visualizing Fake News", the contents of which are incorporated herein by reference.

STATEMENT REGARDING FEDERALLY SPONSORED RESEARCH

This invention was made with government support under grant N00014-13-1-0835 and N00014-16-1-2257 awarded by the Office of Naval Research, and grant W911NF-15-1-0328 awarded by the Army Research Office. The government has certain rights in the invention.

TECHNICAL FIELD

Embodiments of the invention relate to detection of online fake news, and in particular, collecting news articles and detecting and visualizing a news article as fake or not.

BACKGROUND

There are challenges in fake news detection including a lack of a quality labeled dataset and the dynamic nature of fake news, as well as a model that adequately classifies a news article as fake or not. What is needed is a system that provides a quality labeled data set and takes into consideration that dynamic nature of fake news, and makes use of a model that better classifies a news article as fake or not.

Regarding online fake news, the prior art classifies a given user profile as a real user or bot user which does not help identify fake news and real news. Fake profiles are created in social media for several purposes like influencing user opinions, performing cyber-attacks, etc. So, there can be situations where real news can be spread by bots to influence the social media to suppress other information in the social media. Furthermore, prior art systems require human intervention in the process of fake news detection. What is needed is an automated process that enables fake news detection to be applied at scale and that could benefit those that process data on a large scale.

BRIEF DESCRIPTION OF THE DRAWINGS

Embodiments are illustrated by way of example, and not by way of limitation, and will be more fully understood with reference to the following detailed description when considered in connection with the figures in which:

FIG. 2 includes a table providing statistics of data collected according to embodiments of the invention;

FIG. 4 is a table providing a comparison with existing fake news detection datasets according to embodiments of the invention;

FIG. 7 illustrates detailed statistics of a fake new network repositor according to embodiments of the invention;

FIG. 8 illustrates a word cloud of fake news content and true news content according to embodiments of the invention;

FIG. 13 illustrates a distribution of count of followers and followees related to fake and real news according to embodiments of the invention;

FIG. 14 provides a comparison of temporal user engagements of fake and real news according to embodiments of the invention;

FIG. 15 illustrates spatial distribution of users posting tweets related to fake and real news according to embodiments of the invention;

FIG. 16 is a table of fake news detection performance according to an embodiment of the invention;

FIG. 19 is a table of detailed statistics of the datasets according to embodiments of the invention;

FIG. 20 illustrates analysis of distribution of structural features for macro-level propagation networks of fake news and real news in two datasets according to embodiments of the invention;

FIG. 21 provides a comparison of structural features for micro-level propagation networks of fake news and real news according to embodiments of the invention;

FIG. 23 provides an analysis of the distribution of linguistic features for micro-level propagation networks of fake news and real news in two different datasets according to embodiments of the invention;

FIG. 24 provides test data results for the baseline features on different learning algorithms in order to choose the one that achieves the best performance according to embodiments of the invention;

FIG. 25 a graphic depiction of detection performance for HPNF with different learning algorithms according to embodiments of the invention;

FIG. 26 illustrates evaluation of fake news detection performance on different levels of hierarchical propagation network and compares their contributions to fake news detection according to embodiments of the invention;

FIG. 30 is a word cloud of fake news content and true news content according to embodiments of the invention;

FIG. 31 is a geo-visualization of tweets of fake news and real news according to embodiments of the invention;

FIG. 32 illustrates a social network of users who share fake news and real news according to embodiments of the invention;

WRITTEN DESCRIPTION

I. Overview

Embodiments of the invention provide a system for online news collection, detection of fake news, and visualization of the fake news. As used herein, the term fake news is a broad term generally meant to include any form of disinformation, such as conspiracy theories, fake news, discussions of political scandals, and negative campaigns. The rise of social media provides individuals with significant power to create and/or share disinformation with each other, allowing for the transmission of information that portrays political candidates or groups negatively and has no, or low, evidential basis. As used herein, the term real news is a broad term that encompasses information and news that is the antithesis of fake news.

Figure 1:
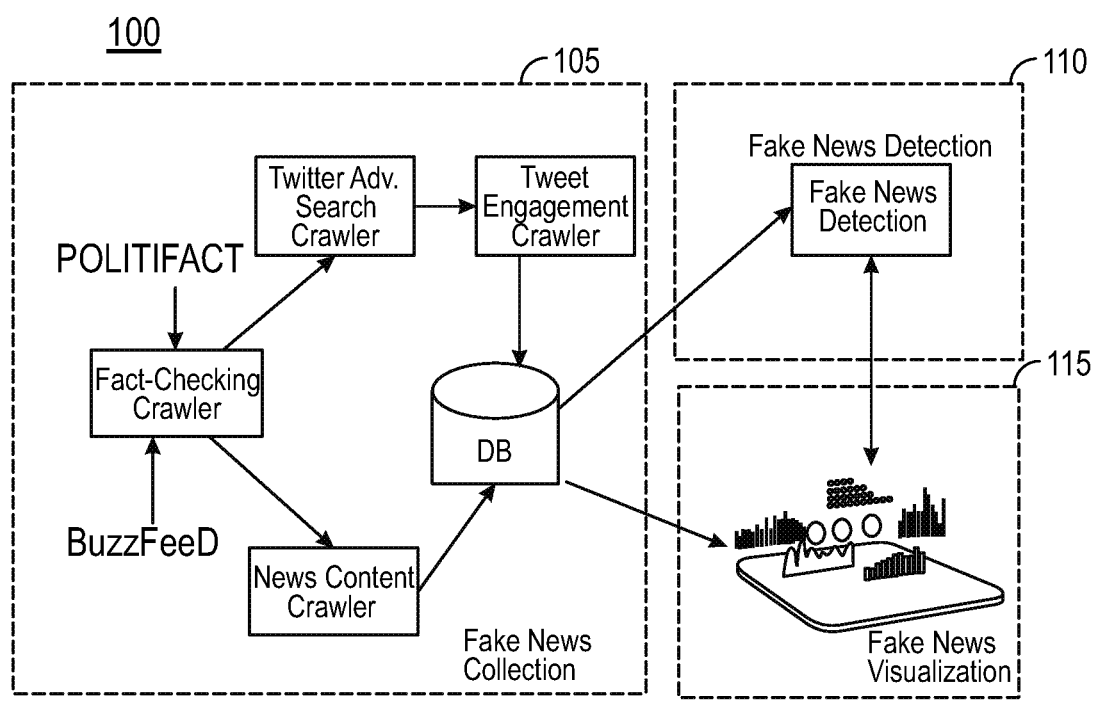
FIG. 1 is a flow chart according to embodiments of the invention.

Embodiments of the invention facilitate detecting fake news. FIG. 1 shows the various components according to embodiments of the invention 100. The functional blocks of embodiments of the invention are as follows:

A. Fake News Collection 105: collecting news content, social media context, and spatiotemporal information, automatically, which provides valuable datasets for the study and detection of fake news;

B. Fake News Detection 110: extracting useful features from the collected news content, social media context, and spatiotemporal information, and building various machine learning models to detect fake news; and C. Fake News Visualization 115: presenting the characteristics of fake news dissemination through effective visualization techniques.

Embodiments of the invention provide an end to end framework for collecting data related to fake news, detecting fake news in the collected data, and visualizing the fake news data, which provides insights into the nature of the data. The data collected in embodiments of the invention is comprehensive for purposes of fake news detection because it includes news content and the social media context, and in some embodiments, spatiotemporal information. The spatiotemporal information relates to, for example, locations of users that post or repost news articles on social media platforms, and timestamps associated with such postings and repostings. Embodiments of the invention use some or all of this information in a classification task and provide a software interface for visualization of the data in different manners. A more detailed discussion of each of the above-mentioned functional blocks follows.

A. Collecting News Data

A.1. Collecting Fake News Data and Social Media Context Information

Fake news is widely spread across various online platforms. Embodiments of the invention collect news, for example, using a web crawler that looks for news content, and also make use of fact-checking websites like PolitiFact as a source for collecting alleged fake news information. In these fact-checking sites, fake news information is provided by trusted authors and relevant claims are made by the authors on why the mentioned news is not true. A web crawler, or simply, a crawler, also referred to as a spider or spiderbot, is an Internet bot that systematically browses the World Wide Web, typically for the purpose of web indexing. Web search engines and some web sites use web crawling or spidering software to update their web content or indices of others sites' web content. Web crawlers copy pages for processing by a search engine which indexes the downloaded pages so users can search more efficiently.

Embodiments of the invention collect fake news in a periodic manner to update a repository. First, embodiments of the invention collect verified fake news and true news from fact-checking websites like PolitiFact on a daily basis. Then, using a social media platform's API, e.g., Twitter's advanced search API, embodiments of the invention crawl and gather the social media posts, e.g., the tweets, which spread the fake/real news in Twitter. Moreover, embodiments of the invention crawl and gather social media engagements of users such as replies to the tweets, retweets, and favorites through Twitter APIs.

Users who interact with social media posts, e.g., tweets, related to fake news are more vulnerable to them. If the user likes the post/tweet related to fake news they are prone to be affected by the fake news. Based on the comments on a post or repost, e.g., retweets, embodiments of the invention infer whether the user is able to differentiate fake news or not. In social media, users form social media groups and so people in the same group will also be affected by the fake news because of the so-called "echo chamber" effect. So, embodiments of the invention also collect the followers and followees of the users who engage with fake news to help characterize user features in the detection task.

The table in FIG. 2 provides statistics of data collected according to embodiments of the invention. Embodiments of the invention use websites, such as fact-checking websites, e.g., www.PolitiFact.com and www.GossipCop.com, to collect the online news articles related to fake news and real news. Embodiments also collect social media posts and engagements, for example, from Twitter using Twitter's advanced search Application Programmatic Interface (API). The collected dataset contains news articles, and tweets, related to fake news and real news posted on Twitter as well as social media engagements including likes, replies, and retweets related to those tweets. In addition to this information, user profile information and the social media network of each of the users is also collected. Embodiments collect the data in a dynamic manner to get a comprehensive dataset.

Embodiments of the invention provide a deep learning based model that uses the collected news content and social media context to detect fake news. The model captures the latent representation of the news content using an autoencoder (a type of Artificial Neural Network (ANN) used to automatically discover representations needed for feature detection or classification of data), captures social media engagements using Long Short-Term Memory (LSTM), a well-known variation of a Recurrent Neural Network (RNN), and predicts whether a news article is fake or not, based thereon.

For the autoencoder, embodiments use the well-known Sequence to Sequence model for deep learning (Seq2Seq) to encode and decode news articles. In natural language processing (NLP), a branch of artificial intelligence (AI), Seq2Seq is a method of encoder-decoder based machine translation that maps an input of sequence to an output of sequence with a tag and attention value. The approach uses two RNNs that work together with a special token and tries to predict the next state sequence from the previous sequence.

In the encoder part, an LSTM is used, wherein each word in a news article sequence is provided as an input and the last timestamp's hidden state of the neural network is considered as the latent representation. The decoder part of the neural network takes the latent representation as input and attempts to reconstruct the original news article sequence. As for the social media engagements, embodiments use Singular-Value Decomposition (SVD) to decompose a user and news article engagement matrix to get the features related to a user. Further, embodiments use the doc2vec model to represent the tweet's text content in the latent space. doc2vec creates a numeric representation of a document, in this case, the text string in a tweet, regardless of its length. Embodiments combine both user features and the text's latent representation together and provide it as an input to the LSTM network to capture the temporal pattern of news diffusion in the neural network for social media content. Finally, the embodiments combine the features learned from both the news content neural network and the neural network for social media content and predict the output. Both the neural networks are learned together in a supervised fashion to extract significant features for the fake news classification task.

Figure 3:
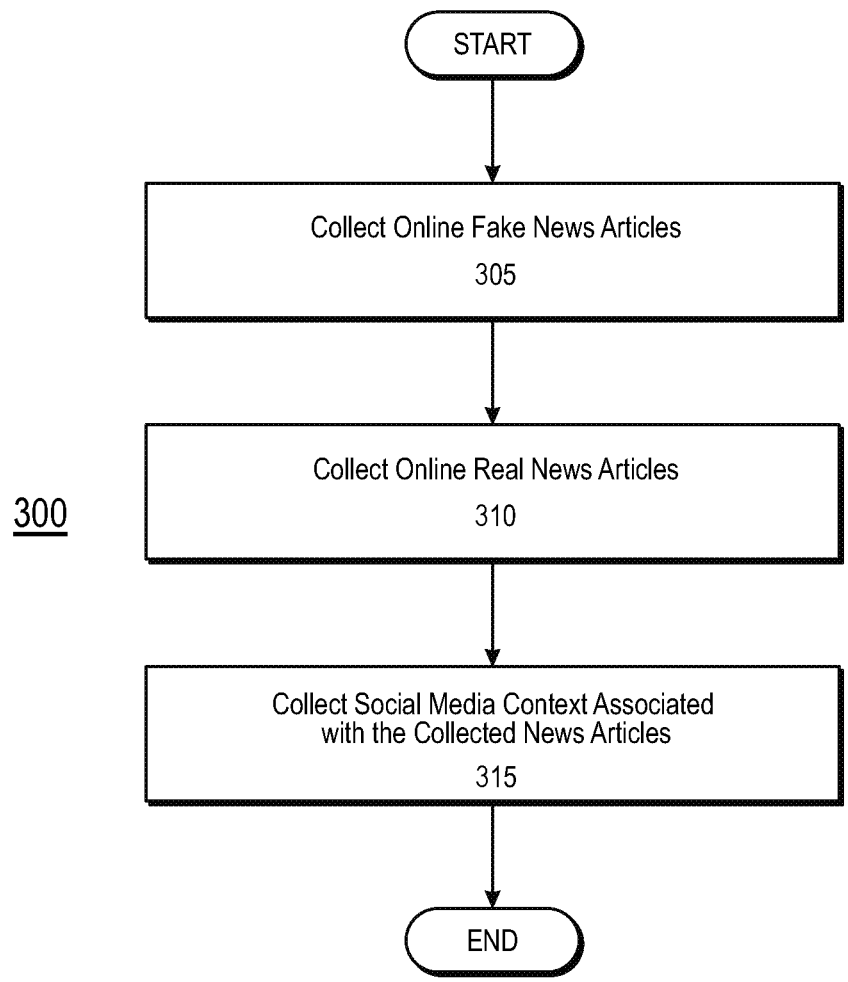
FIG. 3 is flow chart of embodiments of the invention including logic for collecting online fake news articles and logic for collecting online real news articles according to embodiments of the invention.

Thus, as illustrated in the flow chart of FIG. 3, embodiments of the invention 300 include logic 305 for collecting online fake news articles and logic 310 for collecting online real news articles. In one embodiment, the logic collects the online news articles via fact-checking websites. In one embodiment, the logic uses an autoencoder, which in turn uses the seq2seq approach, to capture latent representations of the news articles. Further logic 315 collects social media context associated with the collected online fake and real news articles. According to one embodiment, collecting the social media context includes collecting social media posts relating to the online fake and real news articles, collecting subsequent social media engagements with such posts, collecting user profile information, and collecting social media platform and/or network information for the users that created the collected social media posts and the subsequent social media engagements.

A.2. Collecting Fake News Data, Social Media Context Information, and Spatiotemporal Information A.2.1. Introduction Social media has become a popular means for people to consume and share the news. At the same time, however, it has also enabled the wide dissemination of fake news, i.e., news with intentionally false information, causing significant negative effects on society. To mitigate this problem, the research of fake news detection has recently received a lot of attention. Despite several existing computational solutions for the detection of fake news, however, the lack of comprehensive and community-driven fake news datasets has become one of major roadblocks. Not only are existing datasets scarce, they do not contain the features often required in the study of such, including news content, social media context, and spatiotemporal information. Therefore, embodiments of the invention, to facilitate fake news detection, provide for a fake news data repository, referred to herein as FakeNewsNet, which contains two comprehensive datasets with diverse features in news content, social media context, and spatiotemporal information. A description of the FakeNewsNet follows, including an analysis of the two datasets from different perspectives, and a discussion of the benefits of the FakeNewsNet for potential applications on fake news study on social media.

Detecting fake news on social media presents unique challenges. First, fake news articles, or pieces, may be intentionally written to mislead consumers, which makes it difficult to spot fake news from news content itself. Thus, there is a need to explore information in addition to news content, such as user engagements and social behaviors of users on social media. For example, a credible user's comment that "this is fake news" is a strong signal that the news may be fake. Second, the research community lacks datasets which contain spatiotemporal information to understand how fake news propagates over time in different regions, how users react to fake news, and how useful temporal patterns can be extracted for (early) fake news detection and intervention. Thus, it is necessary to have comprehensive datasets that have news content, social media context and spatiotemporal information to facilitate fake news research. However, existing datasets only cover one or two aspects.

Therefore, embodiments construct and publish a multi-dimensional data repository, termed herein FakeNewsNet, which currently contains two datasets with news content, social media context, and spatiotemporal information. The dataset is constructed using an end-to-end system FakeNewsTracker according to the embodiments. The constructed FakeNewsNet repository has the potential to boost the study of various open research problems related to fake news study.

First, a rich set of features in the datasets provides an opportunity to apply different methods for fake new detection, understand the diffusion of fake news in social networks and intervene in it. Second, the temporal information enables the study of early fake news detection by generating synthetic user engagements from historical temporal user engagement patterns in the dataset. Third, it is possible to investigate the fake news diffusion process by identifying provenances, persuaders, and developing better fake news intervention strategies. The data repository can serve as a starting point for many studies regarding fake news, and provide a better, shared insight into disinformation tactics. Update can be made to this data repository, to expand it with new sources and features, as well as maintain completeness. Embodiments of the invention include constructing and publishing a multi-dimensional data repository for various fake news detection related research such as fake news detection, evolution, and mitigation; and analyzing the datasets from different perspectives to demonstrate the quality of the datasets, understand their characteristics and provide baselines for future fake news detection.

A.2.2. Background

Fake news detection in social media aims to extract useful features and build effective models from existing social media datasets for detecting fake news. Thus, a comprehensive and large-scale dataset with multi-dimensional information in online fake news ecosystem is important. The multi-dimensional information not only provides more signals for detecting fake news but can also be used for research such as understanding fake news propagation and fake news intervention. Though there exist several datasets for fake news detection, the majority of them only contain linguistic features. Few contain both linguistic and social media context features. To facilitate research on fake news, embodiments provide a data repository which includes not only news contents and social media context information, but also spatiotemporal information. For a better comparison of the differences, existing popular fake news detection datasets are discussed and compared with the FakeNewsNet repository, according to an embodiment, in the table of FIG. 4.

BuzzFeedNews: This dataset comprises a complete sample of news published in Facebook from nine news agencies over a week close to the 2016 U.S. election from September 19-23, 26 and 27. Every post and corresponding linked article were fact-checked claim-by-claim by five Buzz Feed journalists. The dataset contains 1,627 articles 826 considered mainstream, 356 articles considered left-wing, and 545 alleged right-wing articles.

LIAR: This dataset was collected from the fact-checking website PolitiFact. It has 12,800 human labeled short statements collected from PolitiFact. The statements are labeled into six categories ranging from completely false to completely true, ranging from: pants on fire, false, barely-true, half-true, mostly true, and true.

BS Detector: This dataset was collected from a browser extension called BS detector developed for checking news veracity. The detector searched all links on a given web page for references to unreliable sources by checking against a manually compiled list of domains. The labels are the outputs of the BS detector, rather than human annotators.

CREDBANK: This is a large-scale crowd-sourced dataset of around 60 million tweets that cover 96 days starting from October 2015. The tweets are related to over 1,000 news events. Each event is assessed for credibility by 30 annotators from Amazon Mechanical Turk.

BuzzFace: This dataset is collected by extending the BuzzFeed dataset with comments related to news articles on Facebook. The dataset contains 2263 news articles and 1.6 million comments discussing news content.

FacebookHoax: This dataset comprises information related to posts from the Facebook pages related to scientific news (non-hoax) and conspiracy (hoax) pages collected using the Facebook Graph API. The dataset contains 15,500 posts from 32 pages (14 conspiracy and 18 scientific) with more than 2,300,000 likes.

From the table in FIG. 4, it is seen that no existing public dataset can provide all possible features of news content, social media context, and spatiotemporal information. Existing datasets have some limitations that the embodiments address in the data repository. For example, BuzzFeedNews only contains headlines and text for each news piece and covers news articles from very few news agencies. The LIAR dataset contains mostly short statements instead of entire news articles with the meta-attributes. The BS Detector data is collected and annotated by using a developed news veracity checking tool, rather than using human expert annotators. The CREDBANK dataset was originally collected for evaluating tweet credibilities—the tweets in the dataset are not related to fake news articles and hence cannot be effectively used for fake news detection. The BuzzFace dataset has basic news content and social media context information but it does not capture the temporal information. The FacebookHoax dataset consists of very few instances about conspiracy theories and scientific news.

To address the disadvantages of existing fake news detection datasets, the FakeNewsNet repository, according to the embodiments, collects multi-dimension information from news content, social media context, and spatiotemporal information from different types of news domains such as political and entertainment sources.

A.2.3. Dataset Integration

A description follows of the dataset integration process, according to embodiments of the invention, for the FakeNewsNet repository, including a discussion of how to collect news content with reliable ground truth labels, as well as how to obtain additional social media context and spatial temporal information.

Figure 5:
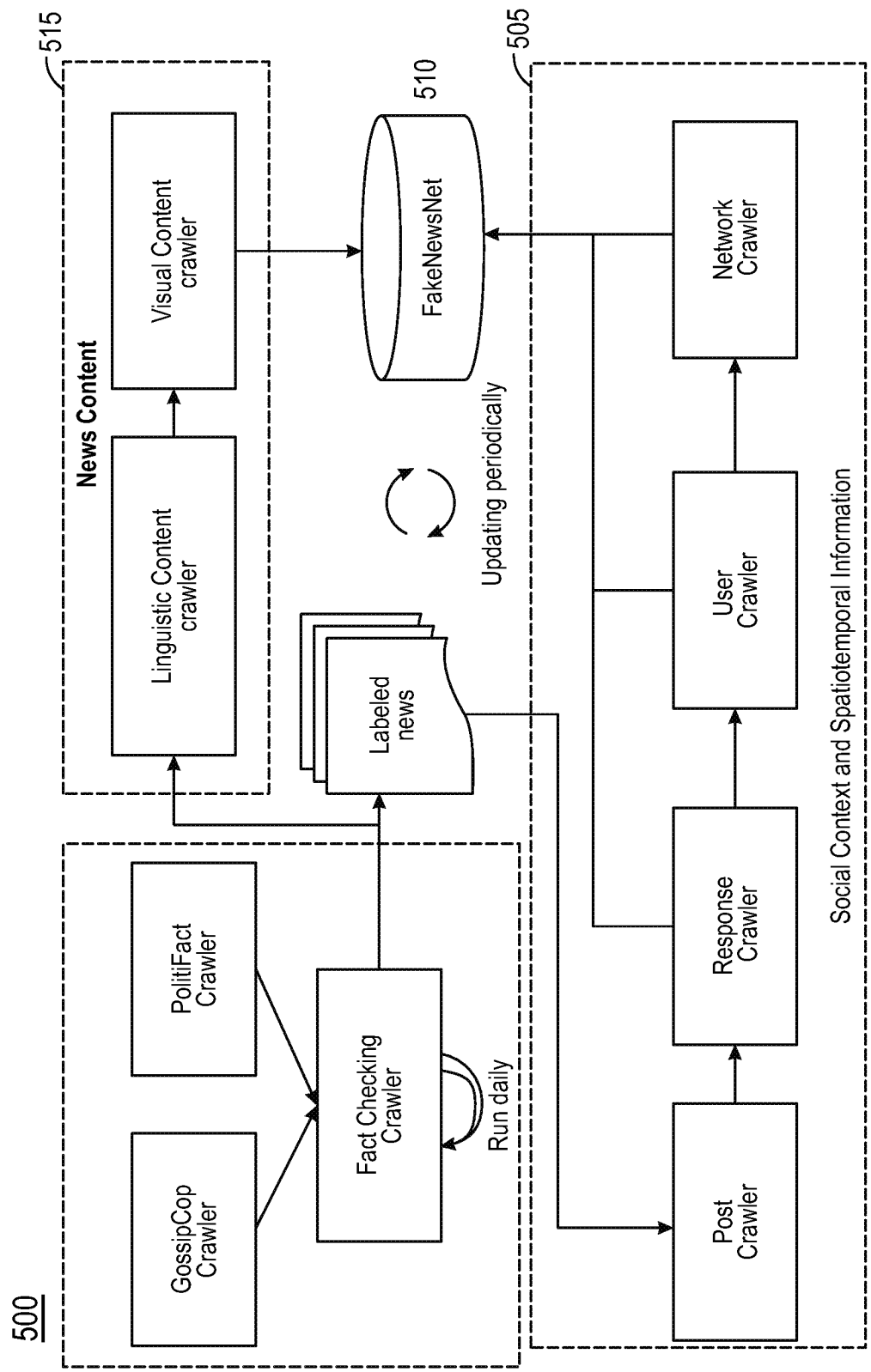
FIG. 5 is a functional block diagram for collecting news contents with reliable ground truth labels, and obtaining additional social media context and spatial temporal information, according to embodiments of the invention.

News Content: To collect reliable ground truth labels for fake news, with reference to FIG. 5, embodiments utilize fact-checking websites to obtain at 500 news content for fake news and real news such as PolitiFact and GossipCop. In PolitiFact, journalists and domain experts review the political news and provide fact-checking evaluation results to claim news articles as fake or real. Embodiments utilize these claims as ground truths for fake and real news pieces. In PolitiFact's fact-checking evaluation result, the source URLs of the web page that published the news articles are provided, which can be used to fetch the news content related to the news articles.

In some cases, the web pages of source news articles are removed and are no longer available. To solve this problem, embodiments i) check if the removed page was archived and automatically retrieve content at the Wayback Machine; and ii) make use of Google web search in an automated fashion to identify a news article that is most related to the actual news.

GossipCop is a website for fact-checking entertainment stories aggregated from various media outlets. GossipCop provides rating scores on a scale of 0 to 10 to classify a news story in degrees from fake to real. It is observed that almost 90% of the stories from GossipCop have scores less than 5, presumably because the primary purpose of GossipCop is to showcase more fake stories.

In order to collect real, or true, entertainment news pieces, one embodiment crawl the news articles from E! Online, which is a well-known trusted media website for publishing entertainment news pieces. One embodiment considers all the articles from E! Online as real news sources. One embodiment collects all the news stories from GossipCop with rating scores less than 5 as fake news stories.

Since GossipCop does not explicitly provide the URL of the source news article, embodiments search the news headline in Google or the Wayback Machine archive to obtain the news source information. The headline of the GossipCop story articles are generally written to reflect the actual fact and may not be used directly. For example, one of the headlines, "Jennifer Aniston NOT Wearing Brad Pitts Engagement Ring, Despite Report" mentions the actual fact instead of the original news articles title.

Embodiments utilize some heuristics to extract proper headlines such as i) using the text in a quoted string; ii) removing negative sentiment words. For example, some headlines include a quoted string which is the exact text from the original news source. In this case, embodiments extract the named entities through Stanford's CoreNLP tool from the headline, and quoted strings from the headline to form the search query. For example, in the headline Jennifer Aniston, Brad Pitt NOT "Just Married" Despite Report, embodiments extract named entities including Jennifer Aniston, Brad Pitt and quoted strings including Just Married and form the search query as "Jennifer Aniston Brad Pitt Just Married" because the quoted text in addition with the named entities mostly provides the context of the original news. As another example, the headline is written in the negative sense to correct the false information, e.g., "Jennifer Aniston NOT Wearing Brad Pitts Engagement Ring, Despite Report". So one embodiment removes negative sentiment words retrieved from SentiWordNet and some hand-picked words from the headline to form the search query, e.g., "Jennifer Aniston Wearing Brad Pitts Engagement Ring".

Social media context: The user engagements related to the fake and real news pieces from fact-checking websites are collected at 505 using a search API provided by social media platforms such as the Twitter's Advanced Search API. The search queries for collecting user engagements are formed from the headlines of news articles, with special characters removed from the search query to filter out the noise. After embodiments obtain the social media posts that directly spread news pieces, the embodiments further fetch the user response towards these posts such as replies, likes, and reposts. In addition, when embodiments obtain all the users engaging in news dissemination process, all the metadata for user profiles, user posts, and the social network information is also collected.

Spatiotemporal Information: includes spatial and temporal information. For spatial information, embodiments obtain the locations explicitly provided in user profiles. The temporal information indicates the timestamps of user engagements, which can be used to study how fake news pieces propagate on social media, and how the topics of fake news are changing over time. Since fact-checking websites periodically update newly coming news articles, embodiments dynamically collect these newly added news pieces and update the FakeNewsNet repository as well, at 510. In addition, embodiments keep collecting the user engagements for all the news pieces periodically in the FakeNewsNet repository such as the recent social media posts, and second order user behaviors such as replies, likes, and retweets. For example, one embodiment runs the news content crawler 515 and an update Tweet collector per day. The spatiotemporal information provides useful and comprehensive information for studying fake news problem from a temporal perspective.

B. Detecting Fake News

Detecting fake news can be a difficult task as, often times, fake news is intentionally written to falsify information.

Figure 6:
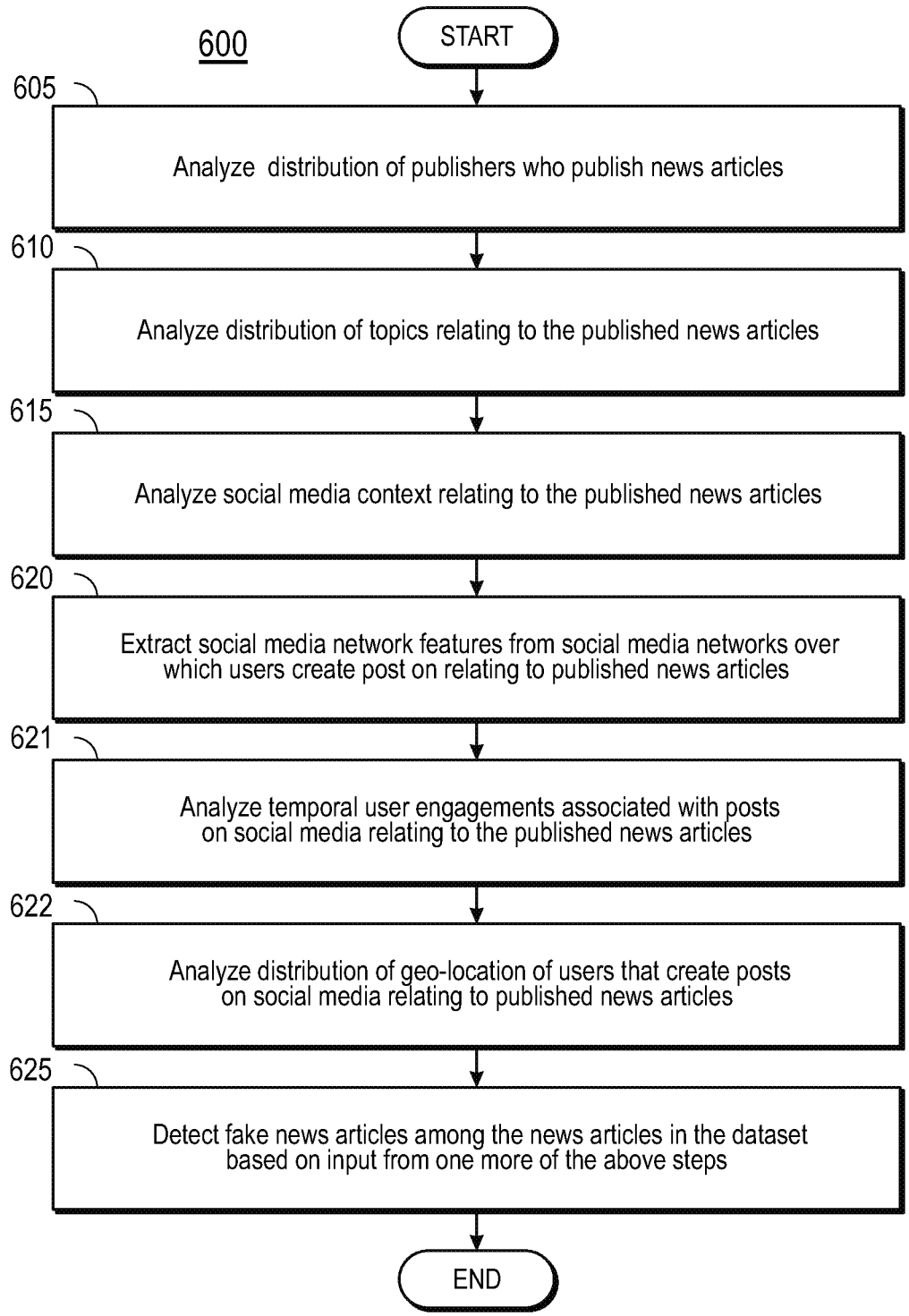
FIG. 6 is a flow chart, according to embodiments of the invention, for detecting fake news.

B.1. Fake News Detection Using News Content, Social Media Context, and Spatiotemporal Information One embodiment of the invention uses a data repository that contains not just news content, and social media context information, but also spatiotemporal information for detecting fake news on social media platforms. With reference to FIG. 6, embodiments of the invention 600, as discussed in further detail below in this section, include logic for detecting fake news, comprising logic 605 to analyze a distribution of publishers who publish news articles. In one embodiment the published plurality of news articles are stored in a dataset for further analysis. Logic 610 analyzes a distribution of topics relating to the published news articles in the dataset, while logic 615 analyzes a social media context relating to the published news articles. In one embodiment, logic 615 analyzes profiles of social media users that create posts on social media relating to the published news articles, and alternatively, or further, analyzes social media user posts on social media relating to the published news articles. Logic 620 extracts social media network features from the social media networks over which the social media users create a post on social media relating to the published news articles. Finally, logic 635 detects fake news articles among the news articles in the dataset based on the analysis of the distribution of publishers, the analysis of the distribution of the plurality of topics, and the analysis of the social media context.

According to one embodiment, the logic 615 that analyzes the profiles of social media users that create posts on social media relating to the published news articles comprises logic to compare a creation time of a social media user profiles with a current date; and logic to check whether the social media user profiles are created by a social media bot.

According to one embodiment, the logic 615 that analyzes social media user posts on social media relating to the published news articles comprises logic that analyzes a distribution of social media user sentiments expressed in response to the social media user posts relating to the published news articles. According to this embodiment, the logic also, or alternatively, analyzes a distribution of temporal user engagements, such as likes, reposts, and replies to posts or reposts on social media, associated with the posts on social media relating to the published news articles.

The logic 620 that extracts social media network features from the social media networks over which the social media users create a post on social media relating to the published news articles provides such information to logic 635 which can then detect fake news articles among the plurality of news articles in the dataset further based on the extracted social media network features. Likewise, the logic 620 that extracts social media network features from the social media networks over which the social media users create a post on social media relating to the published news articles comprises logic to obtain a follower count and a followees count of social media users that create the posts on social media relating to the published plurality of news articles.

This embodiment may also include logic 625 to analyze temporal user engagements associated with posts on social media relating to the published news articles and provide such information to logic 635 which can then detect fake news articles among the plurality of news articles in the dataset further based on the analysis of the temporal user engagements.

The embodiment may also include logic 630 to analyze a distribution of geo-location of the social media users that create the posts on social media relating to the published news articles and similarly provide such information to logic 635 so it can detect fake news articles among the plurality of news articles in the dataset further based on the analysis of the distribution of geo-location of the social media users that create the posts on social media relating to the published plurality of news articles.

B.1.1. Data Analysis

FakeNewsNet has multi-dimensional information related to news content, social media context, and spatiotemporal information. In this section, preliminary quantitative analysis is provided to illustrate the features of FakeNewsNet.

Various fake news detection schemes are employed to evaluate the quality of the FakeNewsNet repository. The detailed statistics of FakeNewsNet repository is illustrated in FIG. 7.

B.1.1.1. Assessing News Content

Since fake news attempts to spread false claims in news content, the most straightforward means of detecting it is to find clues in a news article itself to detect fake news. First, this embodiment analyzes the topic distribution of fake and real news articles. From FIG. 8, which illustrates a word cloud of a new body text for fake and real news on PolitiFact and GossipCop, at (a) and (b), it is observed that the fake and real news of the PolitiFact dataset is mostly related to a political campaign. In the case of GossipCop dataset from FIG. 8, at (c) and (d), it is observed that the fake and real news are mostly related to gossip about the relationships among celebrities. In addition, the topics for fake news and real news are slightly different in general. However, for specific news, it is difficult to only use topics in the content to detect fake news, which necessitates the need to utilize other auxiliary information such as social media context.

The distribution of publishers who publish fake news on both datasets is considered as well, according to this embodiment. In PolitiFact, there are in total 301 publishers publishing 432 fake news pieces, among which 191 of all publishers only publish one piece of fake news, and 40 publishers publish at least two pieces of fake news such as theglobalheadlines.net and worldnewsdailyreport.com. For GossipCop, there are in total 209 publishers publishing 6,048 fake news pieces, among which 114 of all publishers only publish one piece of fake news, and 95 publishers publish at least two pieces of fake news such as hollywoodlife.com and celebrityinsider.org. The reason may be that these fact-checking websites try to identify those check-worthy breaking news events regardless of the publishers, and fake news publishers can be shut down after they were reported to publish fake news pieces.

B.1.1.2. Measuring Social Media Context

Social media context represents the news proliferation process over time, which provides useful auxiliary information to infer the veracity of news articles. Generally, there are three major aspects of the social media context that this embodiment represents: user profiles, user posts relating to news articles, and network structures. A discussion of these aspects on FakeNewsNet follows along with the usage of these features to help fake news detection.

User profiles on social media have been shown to be correlated with fake news detection. Research has also shown that fake news pieces are likely to be created and spread by non-human accounts, such as social bots or cyborgs. The following discussion illustrates some user profile features in the FakeNewsNet repository.

Figure 9:
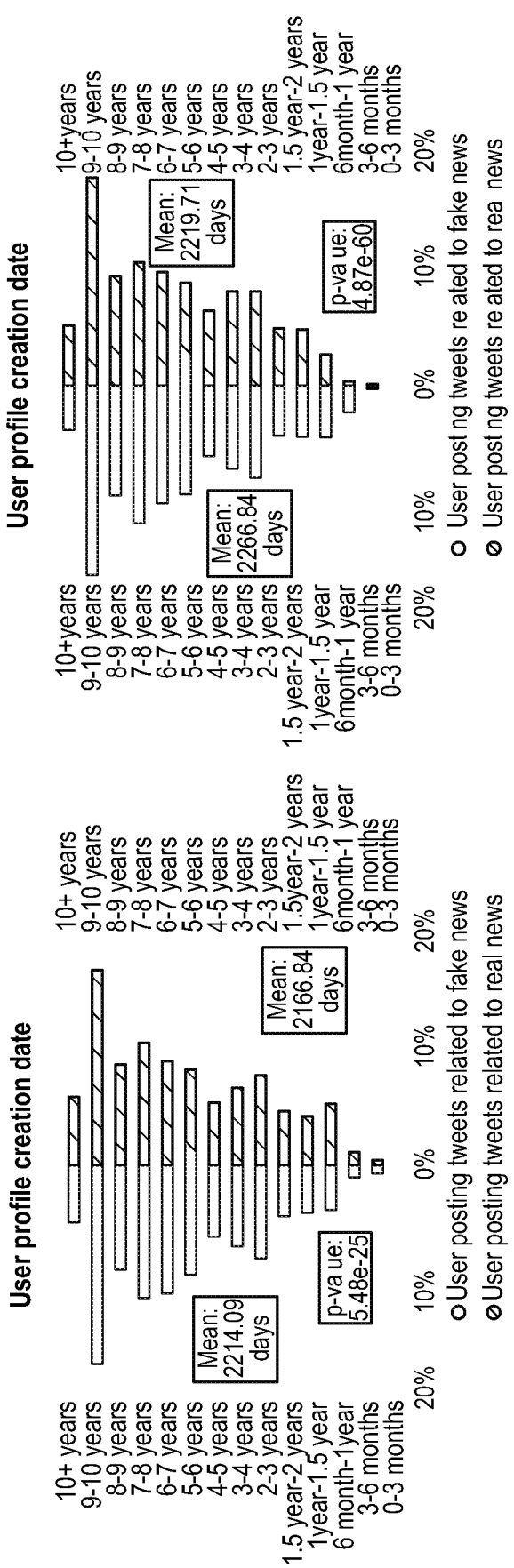
FIG. 9 shows the results of the distribution of user profile creation dates on two different datasets according to embodiments of the invention.

First, this embodiment considers whether the creation time of user accounts for fake news and true news are different or not. The embodiment computes the time range of account register time with the current date. The results of the distribution of user profile creation dates on PolitiFact and GossipCop are shown in FIG. 9. It can be seen that the account creation time distribution of users who post fake news is significantly different from those who post real news, with the p-value<0.05 under statistical t-test. In addition, it is not necessary that users with an account created for a longer time or a shorter time post fake/real news more often. For example, the mean creation time for users posting fake news (2214.09) is less than that for real news (2166.84) in PolitiFact; while opposite is the case in GossipCop dataset.

Figure 10:
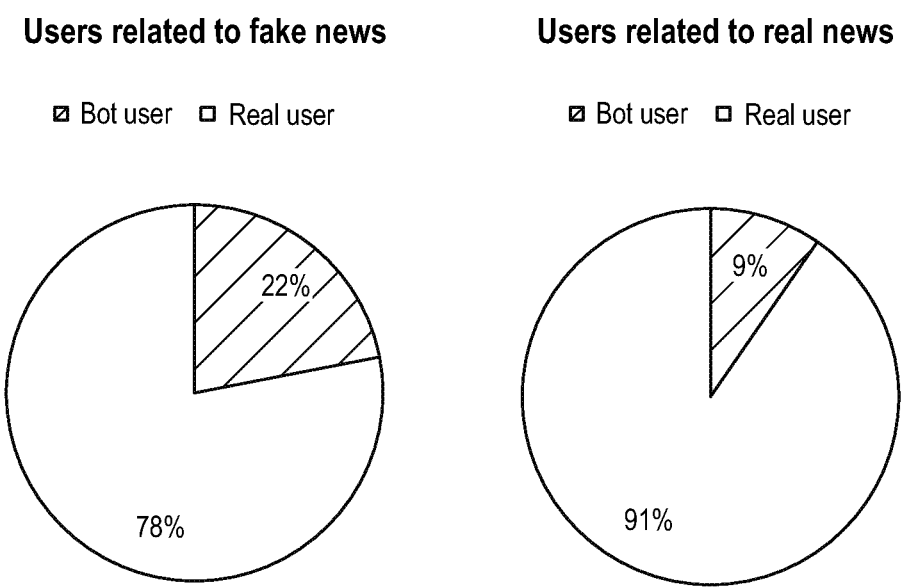
FIG. 10 shows the ratio of the bot and human users involved in tweets related to fake and real news according to embodiments of the invention.

Next, the embodiment looks at the user profiles to assess the social bots effects. In testing, the embodiment randomly selected 10,000 users who posted fake and real news and performed bot detection using a known bot detection algorithm Botometer API. The Botometer takes, for example, a Twitter username as input and utilizes various features extracted from metadata and outputs a probability score in [0, 1], indicating how likely the user is a social bot. One embodiment sets the threshold of 0.5 on the bot score returned from the Botometer results to determine bot accounts. FIG. 10 shows the ratio of the social media bot to human users involved in tweets related to fake and real news. It can be seen that bots are more likely to post tweets related to fake news than real users.

For example, almost 22% of users involved in fake news are bots, while only around 9% of users are predicted as bot users for real news. Similar results were observed with different thresholds on bot scores based on both datasets. This indicates that there are bots in Twitter for spreading fake news. In addition, it is understood that most users that spread fake news (around 78%) are still more likely to be humans than bots (around 22%).

Social media users that create posts on social media about a news article and users that respond to such posts, for example, with a comment or repost, express their emotions or opinions towards fake news through the social media posts, such as skeptical opinions, sensational reactions, etc. These features are important signals to study fake news and disinformation in general.

Figure 11:
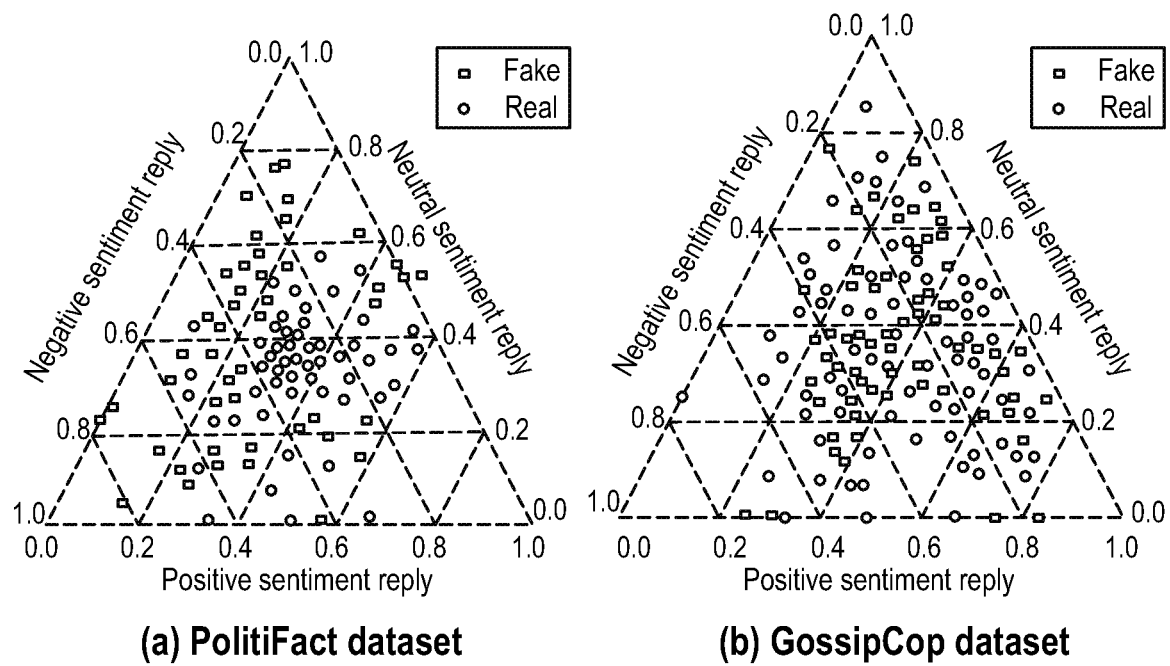
FIG. 11 illustrates a ternary plot of the ratio of positive, neutral and negative sentiment replies for fake and real news according to embodiments of the invention.

Thus, this embodiment performs sentiment analysis on the replies of user posts that spreading fake news and real news using a well-known unsupervised prediction tool, VADER. It is a lexicon and rule-based sentiment analysis tool that is specifically attuned to sentiments expressed in social media. FIG. 11 shows the relationship between positive, neutral and negative replies for all news articles, in particular, it shows a ternary plot of the ratio of the positive, neutral and negative sentiment replies for fake and real news. For each news piece, one embodiment obtains all the replies for the news piece and predicts the sentiment as positive, negative, or neutral. Then we calculate the ratio of positive, negative, and neutral replies for the news. For example, if a news piece has the sentiment distribution of replies as [0.5, 0.5, 0.5], it occurs in the middle of the very center of the triangle (a) of FIG. 11. It can also be seen that the real news have a larger number of neutral replies over positive and negative replies whereas fake articles have a bigger ratio of negative sentiments. In the case of the sentiment toward the replies on the GossipCop dataset shown in triangle (b) of FIG. 11, no significant differences are observed between fake and real news. This could be because of the difficulty in identifying fake and real news related to entertainment news.

This embodiment further analyzes the distribution of likes, reposts (e.g., retweets), and replies to posts/reposts (tweets, retweets) of a post relating to a published news article, which can help gain insights on user interaction networks related to fake and real news. Social science studies have theorized the relationship between user behaviors and their perceived beliefs on the information on social media. For example, the behaviors of likes and retweets are more emotional while replies are more rational.

Figure 12:
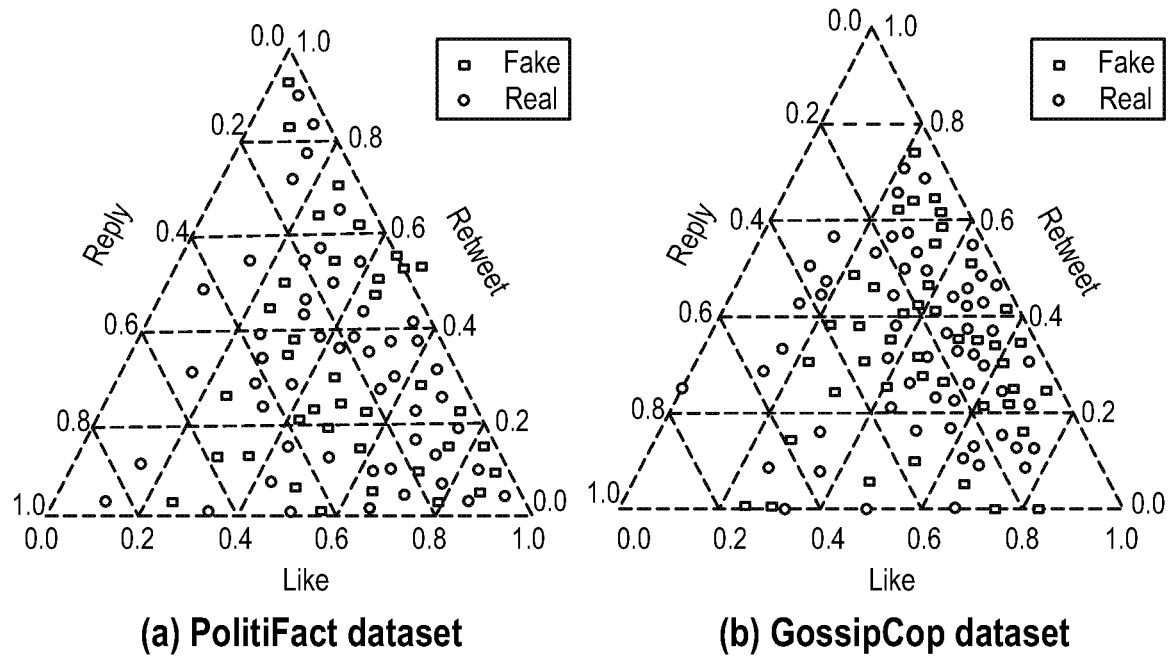
FIG. 12 illustrates a ternary plot of the ratio of likes, retweet and reply of retweets related to fake and real news according to embodiments of the invention.

A plot of the ternary triangles which illustrate the ratio of replies, retweets, and likes from the second order engagements towards the posts that spread fake news or real news pieces is provided in FIG. 12. It is observed that the: i) fake news pieces tend to have fewer replies and more retweets; ii)

real news pieces have more ratio of likes than fake news pieces, which may indicate that social media users are more likely to agree on real news. The differences in the distribution of user behaviors between fake news and real news provide possible insight into users' beliefs characteristics. FakeNewsNet provides real-world datasets to understand the social factors of user engagements and underlie social science as well.

Social media network users tend to form different networks on social media in terms of interests, topics, and relations, which serve as the fundamental paths for information diffusion. Fake news dissemination processes tend to form an echo chamber cycle, highlighting the value of extracting network-based features to represent these types of network patterns for fake news detection.

Embodiments of the invention consider the social network statistics of all the users that spread fake news or real news. The social network features such as followers count and followee count can be used to estimate the scope of how the fake news can spread in social media. A plot of the distribution of follower count and followee count related to fake and real news is shown in FIG. 13. It can see that: i) the follower and followee count of the users generally follows a power law distribution, which is commonly observed in social network structures; ii) there is a spike in the followee count distribution of both users and this is because of the restriction imposed by Twitter on users to have at most 5000 followees when the number following is less than 5000.

B.1.1.3. Characterizing Spatiotemporal Information

It is known that users' temporal responses can be modeled using deep neural networks to help detect fake news, and deep generative models can generate synthetic user engagements to help early fake news detection. The spatiotemporal information in FakeNewsNet depicts the temporal user engagements for news articles, which provides the necessary information to further study the utility of using spatiotemporal information to detect fake news.

First, this embodiment investigates if the temporal user engagements, such as posts, replies, retweets, are different for fake news and real news with similar topics, e.g., fake news "TRUMP APPROVAL RATING Better than Obama and Reagan at Same Point in their Presidencies" from Jun. 9, 2018 to Jun. 13, 2018 and real news "President Trump in Moon Township Pennsylvania" from Mar. 10, 2018 to Mar. 20, 2018. As shown in FIG. 14, which graphically illustrates a comparison of temporal user engagements of fake and real news, it is observed that: i) for fake news, there is a sudden increase in the number of retweets and it remains constant beyond a short time whereas, in the case of real news, there is a steady increase in the number of retweets; ii) fake news pieces tend to receive fewer replies than real news. Similar observations are provided in the table in FIG. 7 in which replies count for 5.76% among all Tweets for fake news, and 7.93% for real news. The differences of diffusion patterns for temporal user engagements have the potential to determine the threshold time for early fake news detection. For example, if the sudden increase of user engagements can be predicted, then it should be possible to use the user engagements before the time point and detect fake news accurately to limit the affect size of fake news spreading.

Next, this embodiment demonstrates the geo-location distribution of users engaging in fake and real news (See FIG. 15 for PolitiFact dataset). The illustration shows the locations explicitly provided by users in their profiles, and it can be seen that users in the PolitiFact dataset who post fake news have a different geo-location distribution than those that post real news. Since it is usually sparse of locations provided by users explicitly, the embodiment can further consider the location information attached with Tweets, and even utilize existing approaches for inferring the user locations.

B.1.1.4. Fake News Detection Performance

This subsection discusses utilizing the PolitiFact and GossipCop datasets from the FakeNewsNet repository to perform fake news detection. 80% of data is used for training and 20% for testing. For evaluation metrics, accuracy, precision, recall and F1 score are used. Several state-of-the-art baselines for fake news detection are employed.

News content: To evaluate the news content, the text content from source news articles are represented as a one-hot encoded vector and then standard machine learning models including support vector machines (SVM), logistic regression (LR), Naive Bayes (NB), and CNN, are applied. For SVM, LR, and NB, the default settings provided in the scikit-learn were used without tuning parameters. For CNN, the standard implementation with default setting was used. The classification of news articles using Social article fusion (SAF/S) model that utilizes autoencoder for learning features from news articles to classify new articles as fake or real was also used.

Social media context: In order to evaluate the social media context, a variant of SAF model was used, i.e., SAF/A, which utilizes the temporal pattern of the user engagements to detect fake news.

News content and social media context: Social Article Fusion (SAF) model that combines SAF/S and SAF/A was used. This model uses an autoencoder with LSTM cells of 2 layers for encoder as well as decoder and also a temporal pattern of the user engagements is also captured using another network of LSTM cells with 2 layers.

The experimental results are shown in the table in FIG. 16. It can be seen that: i) for news content-based methods, SAF/S performs better in terms of accuracy, recall, and F1 score while logistic regression has better precision than others. SAF/A provides a similar result around 66.7% accuracy as SAF/S but has higher precision. The compared baseline models provide reasonably good performance results for fake news detection where accuracy is mostly around 65% on PolitiFact; ii) it is observed that SAF achieves relatively better accuracy than both SAF/S and SAF/A for both datasets. For example, SAF has around 5.65% and 3.68% performance improvement than SAF/S and SAF/A on PolitiFact. This indicates that user engagements can help fake news detection in addition to news articles on PolitiFact dataset.

In summary, FakeNewsNet provides multiple dimensions of information that has the potential to benefit algorithms for fake news detection.

B.1.2. Data Structure

This section describes in detail the structure of FakeNewsNet. The data format is introduced and the API interfaces provided that allow for efficient slicing of the data.

B.1.2.1. Data Format

Each directory possesses the associated auto-generated news ID as its name and contain the following structure: news content.json file, tweets folder, retweets folder. Finally, the user profiles folder and the user timeline tweets folder contain the user profile information about all the users involved in tweet provided in the dataset.

news content.json includes all the meta information of the news articles collected using the provided news source URLs. This is a JSON object with attributes including:

text is the text of the body of the news article.

images is a list of the URLs of all the images in the news article web page.

publish date indicate the date that news article is published.

tweets folder contains the metadata of the list of tweets associated with the news article collected as separate files for each tweet. Each file in this folder contains the tweet objects returned by Twitter API.

retweets folder includes a list of files containing the retweets of tweets associated with the news article. Each file is named as <tweet id>.json and have a list of retweet objects associated with a particular tweet collected using Twitter API.

user_profiles folder includes files containing all the metadata of the users in the dataset. Each file is this directory is a JSON object collected from Twitter API containing information about the user including profile creation time, geo-location of the user, profile image URL, followers count, followees count, number of tweets posted and number of tweets favorited.

user_timeline_tweets folder includes JSON files containing the list of at most 200 recent tweets posted by the user. This includes the complete tweet object with all information related to tweet.

B.1.2.2. API Interface

The full dataset is massive and the actual content cannot be directly distributed because of Twitter's policy. To help readers to better process the data, an API was created that allows the users to download specific subsets of data. The API is provided in the form of multiple Python scripts which are well-documented and a CSV file with news content URLs and associated tweet ids. In order to initiate the API, the user must simply run the main.py file with the required configuration. The API makes use of Twitter Access tokens fetch information related to tweets. Since FakeNewsNet includes multiple data sources, the API provides options to select dataset of interest. Additionally, the API facilitates the user to download specific subsets of dataset like linguistic content only, visual content only, only tweet information only, retweet information only, user information only and social network only.

B.1.3. Potential Applications

FakeNewsNet contains information from multiple dimensions which is useful for many applications. It is understood that FakeNewsNet benefits the study of various topics such as: (early) fake news detection, fake news evolution, fake news mitigation, malicious account detection, as discussed in more detail below.

B.1.3.1. Fake News Detection

One of the challenges for fake news detection is the lack of labeled benchmark dataset with reliable ground truth labels and comprehensive information space, based on which one can capture effective features and build models. FakeNewsNet can help the fake news detection task because it has reliable labels annotated by journalists and domain experts, and multi-dimension information from news content, social media context, and spatiotemporal information.

First, the news content is the fundamental source to find clues to differentiate fake news pieces. For example, a study has shown that the clickbait's headlines usually can serve as a good indicator for recognizing fake news articles. In FakeNewsNet, various attributes of news articles are provided, such as publishers, headlines, body texts, and videos. This information can be used to extract different linguistic features and visual features to further build detection models for clickbaits or fake news. For example, style-based approaches try to detect fake news by capturing the manipulators in the writing style of news contents. In addition, knowledge-based approaches aim to use external sources to fact-check proposed claims in news content. Since news articles are collected directly from fact-checking websites such as PolitiFact and GossipCop, it is possible to provide a detailed description and explanations from the fact-checkers, which are useful for learning common and specific perspectives of in what aspects the fake news pieces are formed.

Second, user engagements represent the news proliferation process over time, which provides useful auxiliary information to infer the veracity of news articles. Generally, there are three major aspects of the social media context: users, generated posts, and networks. Fake news pieces are likely to be created and spread by non-human accounts, such as social bots or cyborgs. Thus, capturing user profiles and characteristics by user-based features can provide useful information for fake news detection. FakeNewsNet includes all the metadata for user profiles. In addition, people express their emotions or opinions towards fake news through social media posts, such as skeptical opinions, sensational reactions, etc. All the user posts are collected for the news pieces, as well as the second engagements (see the table FIG. 7) such as reposts, comments, likes, which can be utilized to extract abundant features, e.g., sentiment scores as in FIG. 11, to capture fake news patterns. Moreover, the fake news dissemination processes tends to form an echo chamber cycle, highlighting the value of extracting network-based features to represent these types of network patterns for fake news detection. A large-scale social network of all the users involved in the news dissemination process is provided (see the table in FIG. 7).

Third, early fake news detection aims to give early alerts of fake news during the dissemination process before it reaches a broad audience. Therefore, early fake news detection methods are highly desirable and socially beneficial. For example, capturing the pattern of user engagements in the early phases could be helpful to achieve the goal of unsupervised detection. Recent approaches utilize advanced deep generative models to generate synthetic user comments to help improve fake news detection performance. FakeNewsNet contains all these types of information, which provides the potential to further explore early fake news detection models.

In addition, FakeNewsNet contains two datasets of different domains, i.e., political and entertainment news domains, which can help in studying common and different patterns for fake news under different topics.

B.1.3.2. Fake News Evolution

The fake news diffusion process also has different stages in terms of people's attention and reactions as time goes by, resulting in a unique life cycle. For example, breaking news and in-depth news demonstrate different life cycles in social media, and social media reactions can help predict future visitation patterns of news pieces accurately even at an early stage. A deeper understanding of how particular stories go viral from normal public discourse can be had by studying the fake news evolution process. First, tracking the life cycle of fake news on social media requires recording essential trajectories of fake news the fake news diffusion in general. Thus, FakeNewsNet has collected the related temporal user engagements which can keep track of these trajectories. Second, for a specific news event, the related topics may keep changing over time and be diverse for fake news and real news. FakeNewsNet is dynamically collecting associated user engagements and allows one to perform comparison analysis (e.g., see FIG. 14), and further investigate distinct temporal patterns to detect fake news. Moreover, statistical time series models such as temporal point process can be used to characterize different stages of user activities of news engagements. FakeNewsNet enables the temporal modeling from real-world datasets, which is otherwise impossible from synthetic datasets.

B.1.3.3. Fake News Mitigation

Fake news mitigation aims to reduce the negative effects brought about by fake news. During the spreading process of fake news, users play different roles, such as provenances: the sources or originators for publishing fake news pieces; persuaders: who spread fake news with supporting opinions; and clarifiers: who propose skeptically and opposing viewpoints toward fake news and try to clarify them. Identifying key users on social media is important to mitigate the effect of fake news. For example, the provenances can help answer questions such as whether a piece of news has been modified during its propagation. In addition, it is useful to identify influential persuaders to limit the spread scope of fake news by blocking the information flow from them to their followers on social media. FakeNewsNet provides rich information about users who were posting, liking, commenting on fake news and real news pieces (see FIG. 12), which enables the exploration of identifying different types of users.

To mitigate the effect of fake news, network intervention aims to develop strategies to control the widespread dissemination of fake news before it goes viral. Two major strategies of network intervention are: i) Influence Minimization: minimizing the spread scope of fake news during dissemination process; ii) Mitigation Campaign: limiting the impact of fake news by maximizing the spread of true news. FakeNewsNet allows for building a diffusion network of users with spatiotemporal information and thus can facilitate the deep understanding of minimizing the influence scopes. Furthermore, it may be possible to identify the fake news and real news pieces for a specific event from FakeNewsNet and study the effect of mitigation campaigns in real-world datasets.

B.1.3.4. Malicious Account Detention

Studies have shown that malicious accounts that can amplify the spread of fake news include social bots, trolls, and cyborg users. Social bots are social media accounts that are controlled by a computer algorithm. Social bots can give a false impression that information is highly popular and endorsed by many people, which enables the echo chamber effect for the propagation of fake news.

The nature of the user who spreads fake news can be studied to identify the characteristics of the bot account used in the diffusion process through FakeNewsNet. Using a feature such as user profile metadata and the historical tweets of the user who spreads fake news along with the social network one could analyze the differences in characteristics of the users to clusters the users as malicious or not. Through a preliminary study in FIG. 10, it is shown that bot users are more likely to exist in fake news spreading process. Even though existing work has studied the bot detection in general, few studies investigate the influences of social bots for fake news spreading. FakeNewsNet can facilitate the understanding of the relationship between fake news and social bots, and further, provide the mutual benefits of studying fake news detection or bot detection.

B.2. Hierarchical Propagation Networks for Fake News Detection

Figure 17:
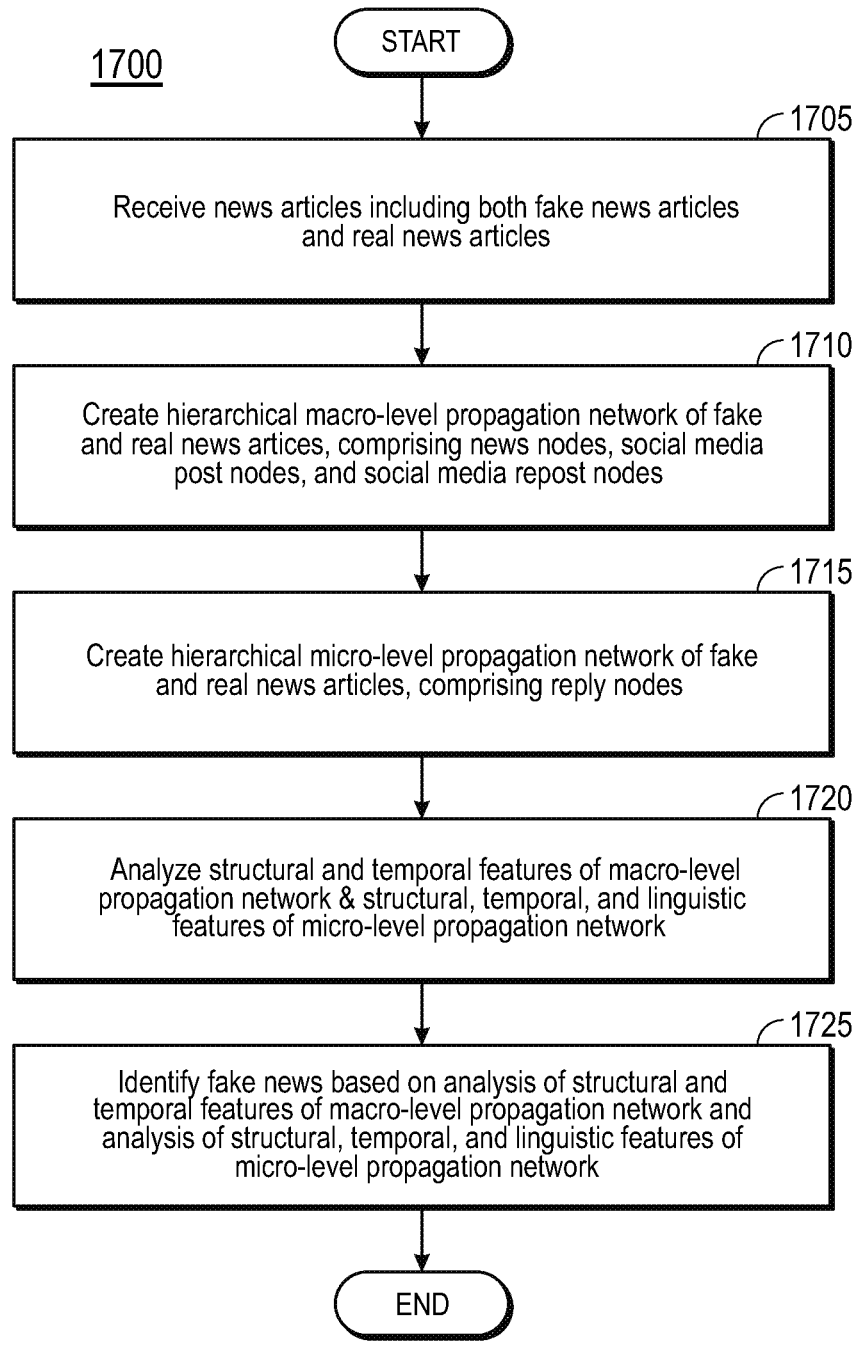
FIG. 17 is a flow chart, according to embodiments of the invention, for detecting fake news.

One embodiment of the invention involves hierarchical propagation networks for detecting fake news. With reference to FIG. 17, embodiments of the invention 1700, as discussed in further detail below in this section, include logic for detecting fake news, comprising logic 1705 to receive news articles including both fake news articles and real news articles, logic 1710 to create a hierarchical macro-level propagation network of the fake news and real news articles, wherein the macro-level network comprises news nodes, social media post nodes, and social media repost nodes, and logic 1715 to create a hierarchical micro-level propagation network of the fake news and real news articles, wherein the micro-level network comprises reply nodes. Logic 1720 then analyzes structural and temporal features of the macro-level propagation network, and analyzes structural, temporal, and linguistic features of the micro-level propagation network. Logic 1725 then identifies fake news among the news articles based on the analysis of the structural and temporal features of the macro-level propagation network and the analysis of the structural, temporal, and linguistic features of the micro-level propagation network.

According to the embodiment, the logic 1720 that analyzes the structural and temporal features of the macro-level propagation network analyzes a depth of, a width of, and number of social media bots in, the macro-level network. That same logic that analyzes the structural, temporal, and linguistic features of the micro-level propagation network analyzes sentiment polarities associated with reply nodes in the micro-level network.

Logic 1725 to identify fake news in the news articles based on the analysis of the structural and temporal features of the macro-level propagation network and the analysis of the structural, temporal, and linguistic features of micro-level propagation network identifies fake news among the news articles based on the analysis of the depth of, a width of, and number of social media bots in, the macro-level network, and on the analysis of the sentiment polarities associated with reply nodes in the micro-level network.

B.2.1. Introduction of Hierarchical Propagation Networks for Fake News Detection Social media enables the wide dissemination of fake news. Because of the detrimental effects of fake news, fake news detection has attracted increasing attention. However, the performance of detecting fake news only from news content is generally limited as fake news pieces are written to mimic true news. News pieces can spread through propagation networks on social media. The news propagation networks usually involve multiple levels. What is needed is a way to exploit news hierarchical propagation networks on social media for the purpose of fake news detection.

To understand the correlations between news propagation networks and fake news, this embodiment first builds a hierarchical propagation network, including a macro-level network and a micro-level network, of fake news and true (real) news, as described below; the embodiment next performs a comparison analysis of the propagation network features from structural, temporal, and linguistic perspectives between fake and real news, utilizing these features to effectively detect fake news. This embodiment presents a data-driven view of a hierarchical propagation network and fake news, and provides for a healthier online news ecosystem.

Detecting fake news on social media presents unique challenges. First, as mentioned previously, fake news may be intentionally written to mislead readers, which makes it nontrivial to detect simply based on content. Second, social media data is large-scale, multi-modal, mostly user-generated, and sometimes anonymous and noisy. Recent research aggregates users' social engagements on news pieces, or articles, to help infer which articles are fake, yielding some promising results. For example, research proposes exploiting users' conflicting viewpoints from social media posts and estimating their credibility values for fake news detection. Further research utilizes a deep neural network model to classify the news propagation path constructed by tweets and retweets to detect fake news.

Figure 18:
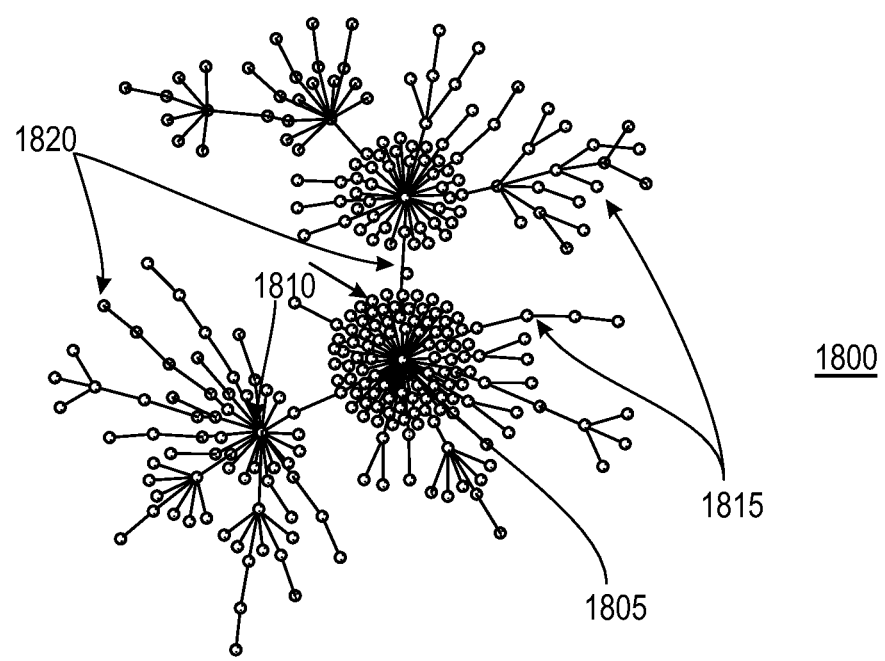
FIG. 18 is an example of the hierarchical propagation network of a fake news article according to embodiments of the invention.

Social media propagation networks have a hierarchical structure, including macro-level and micro-level propagation networks. FIG. 18 graphically depicts at 1800 an example hierarchical propagation network of a fake news pieces fact-checked by PolitiFact. It consists of two types of networks: a macro-level propagation network, and micro-level propagation network. The macro-level propagation network includes news nodes 1805, social media post (e.g., tweet) nodes 1810, and social media repost or repeat (e.g., retweet) nodes 1815. The micro-level propagation network indicates the conversation tree represented by social media reply, or comment, nodes 1820.

Macro-level propagation networks demonstrate the spreading path from news to social media posts (e.g., tweets) sharing the news, and those social media reposts (e.g., retweets) of the original posts. Macro-level networks for fake news are known to be deeper, wider, and includes more social media bots than real news, which provides clues for detecting fake news. Micro-level propagation networks illustrate the user conversations under the posts or reposts, such as replies/comments. Micro-level networks contain user discussions relating to news pieces, which brings auxiliary cues such as sentiment polarities, stance signals, to differentiate fake news. Studying macro-level and micro-level propagation network provides fine-grained social signals to understand fake news and to facilitate fake news detection. Despite seminal work in analyzing the macro-level propagation network from temporal or structural perspectives, no principled study has been conducted on characterizing the propagation network from a hierarchical perspective on social media, let alone exploring whether/how these features can help fake news detection. In addition, it is understood that there has been no research to date that actually provides a deep understanding of (i) how fake news and true news propagate differently in micro-level and macro-level networks; (ii) whether features extracted from hierarchical propagate networks are useful for fake news detection; and (iii) how discriminative are these features. Embodiments investigate the following two questions:

Q1: What are the characteristics of the structure, temporal and linguistic of hierarchical propagation networks of fake and real news?

Q2: Can extracted features be used to detect fake news and how?

By investigating Q1, embodiments assess whether the propagation network features of fake and real news are different or not at the micro-level and macro-level, and to what extent and in what aspects they are different. In addition, by studying Q2, embodiments consider different ways to model propagation network features, analyze the importance of each feature, and show the feature robustness to various learning algorithms. Embodiments of the invention, in answering these two questions, provide the following contributions:

a novel understanding the relationships between hierarchical propagation network and fake news, which lays the foundation of exploiting them for fake news detection; and a principled way to characterize and understand hierarchical propagation network features. Embodiments perform a statistical comparative analysis over these features, including micro-level and macro-level, of fake news and true news.

The embodiments demonstrate the usefulness of the extracted hierarchical network features to classify fake news, the performance of which consistently outperforms state-of-the-art methods. The extracted propagation network features are robust to different learning algorithms, with an average F1>0.80. The effectiveness of these features are validated through feature importance analysis, which found that temporal and structure features perform better than linguistic features. In the following description of this embodiment, section B.2.2 discusses constructing the hierarchical propagation networks for news pieces, section B.2.3 discusses analyzing the feature of macro-level and micro-level propagation networks, and section B.2.4 evaluates the effectiveness of the extracted propagation network features for fake news detection.

B.2.2. Constructing Propagation Networks

Embodiments of the invention construct hierarchical propagation networks including fake news and real news. The embodiments capture the news spreading process in a propagation network with different granularity such as a micro-level network and a macro-level network, which can be further utilized to extract discriminative features from different perspectives for fake news detection.

B.2.2.1. Datasets

Embodiments utilize the public fake news detection data repository discussed above, and referred to herein as FakeNewsNet. The repository consists of news data related to different fact-checking websites and the correspondent information of news content, social media context, and dynamic information.

One embodiment uses the data from following fact-checking websites: GossipCop and PolitiFact, both containing news content with labels annotated by professional journalists, social media context, and temporal information. News content includes the meta-attributes of the news (e.g., body text), the social media context includes the related user social engagements of news items (e.g., user posting/sharing/commenting news in Twitter), and the dynamic information includes the timestamps of users' engagements (posts, reposts, and replies). The detailed statistics of the datasets are shown in the table of FIG. 19.

B.2.2.2. Hierarchical Propagation Networks

The hierarchical propagation network is constructed in different levels of granularity including the micro-level and the macro-level. Micro-level networks represent the network of replies where information is shared at a local level. Macro-level networks represent global propagation of information (e.g., in Twitter through a cascade of retweets). Through the hierarchical propagation network, both local and global patterns of information diffusion related to fake and real news can be studied.

For the macro-level propagation network, nodes represent the new articles, posts (e.g., tweets), and reposts (e.g., retweets), and the edges represent the relationship among them. In a macro-level network, an edge exists from node u to v when a post (tweet) u is reposted or repeated (e.g., retweeted) by some user x and node v is created as a result of it. In Twitter, a tweet or a retweet can be retweeted. However, in the retweet data collected from the official Twitter API, there is no indication whether retweeted sources is an original tweet or another retweet. So the retweet network cannot be explicitly constructed from the data available from official Twitter API data. Hence a different strategy of using the social network of the users is used to construct a macro-level propagation network, according to one embodiment. For inferring the source of the retweet, the embodiment identify the potential user's friends who retweeted the tweet. If the timestamp of the user's retweet is greater than the time stamp of the one of the user friend's retweet time stamp, then the user presumably saw the tweet from one of his/her friends and retweeted it. In a case where an immediate retweet from a user's friend is not found, on embodiment considers the retweet follows from the original tweet rather than retweet of another retweet.

For the micro-level propagation network, the nodes represent the replies to the tweets posting news articles and edges represent the relationship among them. In Twitter, a user can reply to an actual tweet or the reply is a reply of another user. In cases where the user replies to the original tweet, then an edge is created between tweet posting news and the current node. In the case where users' reply is a reply of another user, a conversation thread is formed and this is represented as the chain of replies in the propagation path.

B.2.3. Characterizing Propagation Networks

This embodiment addresses Q1 by performing a comparison analysis on the constructed hierarchical propagation networks for fake news and real news from different perspectives.

B.2.3.1. Macro-Level Propagation Network

The macro-level propagation network encompasses information on a (tweets) posting pattern and information sharing pattern. Embodiments analyze the macro-level propagation network in terms of structure and temporal aspects. Since the same textual information related to a news article is shared across the macro-level network, linguistic analysis is not applicable.

Structural analysis of macro-level networks helps to understand the global spreading pattern of the news pieces. It is understood that learning latent features from the macro-level propagation paths can help to improve fake news detection, while lacking of an in-depth understanding of why and how it is helpful. Thus, embodiments characterize and compare the macro-level propagation networks by looking at various network features as follows.

($S_1$) Tree depth: The depth of the macro propagation network, capturing how far the information is spread-/retweeted by users in social media.

($S_2$) Number of nodes: The number of nodes in a macro-level network indicates the number of users who share the new article and can be a signal for understanding the spreading pattern.

($S_3$) Maximum Outdegree: Maximum outdegree in the macro-level network may reveal the tweet/retweet with the most influence in the propagation process.

($S_4$) Number of cascades: The number of original tweets posting the original news article.

($S_5$) Depth of node with maximum outdegree: The depth at which the node with maximum outdegree occurs. This indicates the steps of propagation it takes for a news piece to be spread by an influential node whose post is retweeted by more users than any other user's repost.

($S_6$) Number of cascades with retweets: indicates number of cascades (tweets) those were retweeted at least once.

($S_7$) Fraction of cascades with retweets: indicates the fraction of tweets with retweets among all the cascades.

($S_8$) Number of bot users retweeting: captures the number of bot users who retweet the corresponding news pieces.

($S_9$) Fraction of bot users retweeting: the ratio of bot users among all the users who are tweeting and retweeting a news piece. This feature can show whether news pieces are more likely to be disseminated by bots or real humans.

The aforementioned structural features are obtained for macro-level propagation networks of fake news and real news in both PolitiFact and GossipCop datasets, according to an embodiment. As shown in the table of FIG. 20, the embodiment analyzes the distribution of structural features and provides the following observations:

- The features $S_1$, $S_2$, $S_5$ and $S_7$ are consistently different from fake news and real news in both datasets, under the statistical t-test.
- The average depth of the macro-level propagation network ($S_1$) of fake news is larger than that of real news in both PolitiFact and GossipCop significantly. This shows fake news has a longer chain of retweets than real news.
- Further, the depth of the node with the maximum outdegree ($S_5$) of fake news is greater than that of real news on both datasets, which indicates fake news takes longer steps to be reposted by an influential user.
- The fraction of cascades with retweets is larger for the macro-level propagation network for fake news than for real news. It shows that more tweets posting fake news are retweeted in average that tweets posting real news.

The temporal user engagements in macro-level network reveal the frequency and intensity of news dissemination process. The frequency distribution of user posting over time can be encoded in recurrent neural networks to learn the features to detection fake news. However, the learned features are not interpretable, and the explanation of why the learned features can help remain unclear. Here, embodiments extract several temporal features from macro-level propagation networks explicitly for more explainable abilities and analyze whether these features are different or not. Following are the features extracted from the macro-level propagation network, ($T_1$) Average time difference between the adjacent retweet nodes: indicates how fast the tweets are retweeted in news dissemination process.

($T_2$) Time difference between the first tweet and the last retweets: captures the life span of the news spread process.

($T_3$) Time difference between the first tweet and the tweet with maximum outdegree: Tweets with maximum outdegree in macro-level propagation network represent the most influential node. This feature demonstrates how long it took for a news article to be retweeted by most influential node.

($T_4$) Time difference between the first and last tweet posting news: indicates how long the tweets related to a news article are posted in Twitter.

($T_5$) Time difference between the tweet posting news and last retweet node in deepest cascade: Deepest cascade represents the most propagated macro-level network in the entire hierarchical network. This time difference indicates the lifespan of the news in the deepest cascade and can show whether news grows in a bursty or slow manner.

($T_6$) Average time difference between the adjacent retweet nodes in the deepest cascade: This feature indicates how frequent a news article is retweeted in the deepest cascade.

($T_7$) Average time between tweets posting news: This time indicates whether tweets are posted in short interval related to a news article.

($T_8$) Average time difference between the tweet post time and the first retweet time: The average time difference between the first tweets and the first retweet node in each cascade can indicate how soon the tweets are retweeted.

Embodiments compare the temporal features of the macro-level propagation network of fake and real news in FIG. 18 (from $T_1$ to $T_8$) and provide for the following observations:

The temporal features $T_2$, $T_3$, $T_4$, $T_7$ and $T_8$ from the macro-level propagation network are statistically significant between fake and real news, under t-test.

The time difference between the first tweet and the last retweets ($T_2$) is smaller for fake news than real news. This indicates that fake news lives shorter than real news in social media on average in the datasets.

Time difference between the first tweet and tweet with maximum outdegree ($T_3$) is smaller for fake news than real news in both datasets. It shows that fake news pieces are more likely to be shared earlier by an influential user than real news.

Further, the time difference between the first and last tweet posting news ($T_4$) is shorter for fake news. This shows tweets related to fake news are posted in a shorter interval of time and spread faster than real news.

B.2.3.2. Micro-Level Propagation Network

Micro-level propagation networks involve users' conversations towards, or relating to, news pieces on social media over time. It contains rich information of user opinions towards news pieces. The following description shows how embodiments extract features from micro-level propagation networks from structural, temporal and linguistic perspectives.

Structure analysis: Structural analysis in the micro-level network involves identifying structural patterns in conversation threads of users who express their viewpoints on tweets posted related to news articles.

($S_{10}$) Tree depth: Depth of the micro-level propagation network captures how far is the conversation tree for the tweets/retweets spreading a news piece.

($S_{11}$) Number of nodes: The number of nodes in the micro-level propagation network indicates the number of comments that are involved. It can measure how popular of the tweet in the root.

($S_{12}$) Maximum Outdegree: In the micro-level network, the maximum outdegree indicates the maximum number of new comments in the chain starting from a particular reply node.

($S_{13}$) Number of cascade with micro-level networks: This feature indicates the number of cascades that have at least one reply.

($S_{14}$) Fraction of cascades with micro-level networks: This feature indicates the fraction of the cascades that have at least one replies among all cascades.

The comparison of structural features for micro-level propagation networks of fake news and real news is demonstrated in the table in FIG. 21. It can be seen that:

Structural feature distributions of $S_{10}$, $S_{11}$, and $S_{14}$ are statistically different between fake news and real news in both datasets.

The micro-level propagation networks of fake news is deeper ($S_{10}$) than real news significantly under t-test in both datasets, which is consistent with the observations in macro-level propagation networks.

In addition, the fraction of cascades with micro-level networks ($S_{14}$) of fake news is greater than that of real news significantly under t-test in both datasets. The reason may be that fake news articles are more likely to be related to controversial and trending topics, which drives more engagements in terms of comments than real news articles.

Temporal analysis: Micro-level propagation network depicts users' opinions and emotions through a chain of replies over time. The temporal features extracted from micro network can help understand exchange of opinions in terms of time. Following are some of the features extracted from the micro propagation network, ($T_9$) Average time difference between adjacent replies in cascade: indicates how frequent users reply to one another.

($T_{10}$) Time difference between the first tweet posting news and first reply node: indicates how soon the first reply is posted in response to a tweet posting news.

($T_{11}$) Time difference between the first tweet posting news and last reply node in micro network: indicates how long a conversation tree lasts starting from the tweet-/retweet posting a new piece.

($T_{12}$) Average time difference between replies in the deepest cascade: indicates how frequent users reply to one another in the deepest cascade.

($T_{13}$) Time difference between first tweet posting news and last reply node in the deepest cascade: indicates the life span of the conversation thread in the deepest cascade of the micro-level network.

Figure 22:
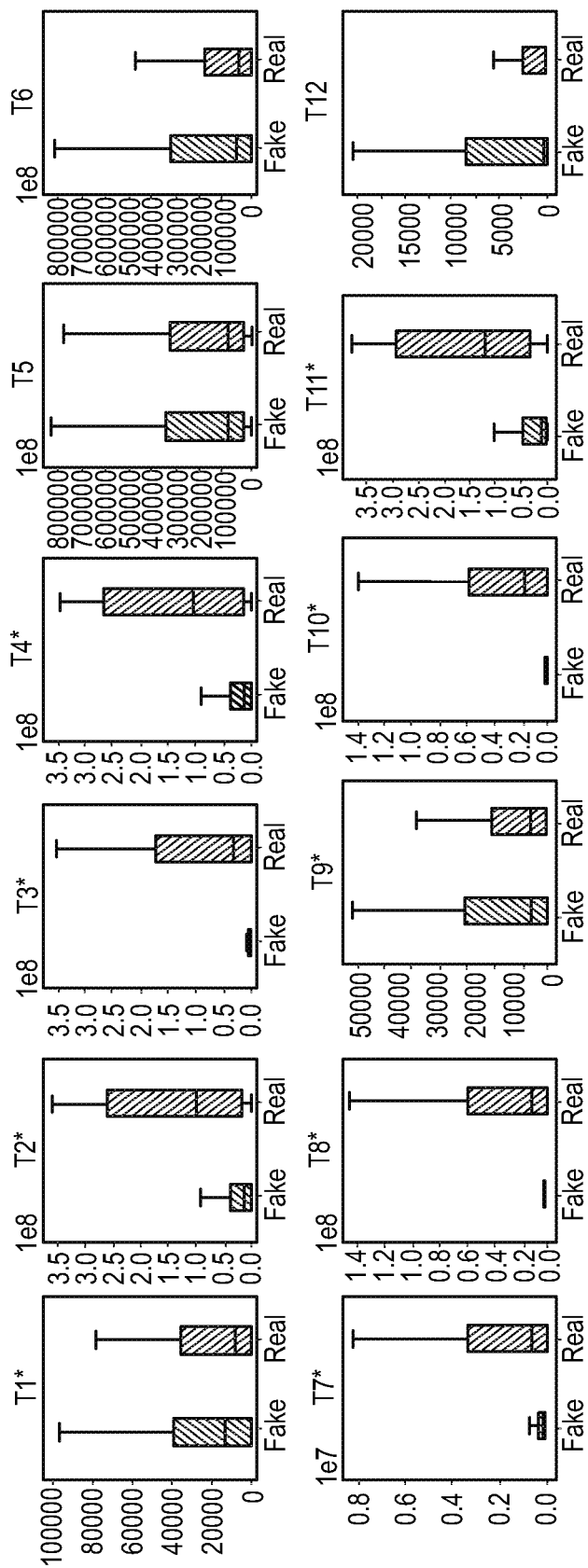
FIG. 22 illustrates visualizations of differences in the distribution of temporal features from micro-level networks of fake and real news according to embodiments of the invention.

The differences in the distribution of temporal features from micro-level networks of fake and real news are visualized in FIG. 22. The box plots demonstrate the differences in the distribution of temporal features of fake and real news pieces from PolitiFact dataset. Statistically significant features are represented by asterisk in the feature title. Similar patterns were observed in the GossipCop dataset, and so those results areomitted. The following observations are made with regard to FIG. 22:

The temporal features $T_9$, $T_{10}$ and $T_{11}$ for fake news and real news are statistically significant under t test for both datasets.

The average time difference between adjacent replies $T_9$ is longer for fake news than real news, and it shows users take a longer time to respond to each other. The time difference between the tweet and the first reply T10 is shorter for fake news, which may indicate that users take less time to reply to tweets related fake and it takes more time to reply to another users comments.

Further, the time difference between the first tweet posting news and the last reply node T11 is shorter for fake news than real news and this clearly indicates users engage with fake news for a shorter interval of time and this is consistent with macro-level propagation networks.

Linguistic analysis: People express their emotions or opinions towards fake news through social media posts, such as skeptical opinions, sensational reactions, etc. This textual information has been shown to be related to the content of original news pieces. Thus, it is useful to extract linguistic-based features to help find potential fake news via reactions from the general public as expressed in comments from micro-level propagation network. Embodiments demonstrate the sentiment features extracted from the comment posts, as the representative of linguistic features. Regarding stance features, existing tools on stance prediction generally exploit the similar set of features with sentiment and more nuanced aspects of opinions towards specific targets, which is not directly available in the datasets. One embodiment utilizes the pre-trained model VADER to predict the sentiment score for each user reply, and extract a set of features related to sentiment as follows, ($L_1$) Sentiment ratio: considers a ratio of the number of replies with a positive sentiment to the number of replies with negative sentiment as a feature for each news articles because it helps to understand whether fake news gets more number of positive or negative comments.

($L_2$) Average sentiment: Average sentiment scores of the nodes in the micro-level propagation network. Sentiment ratio does not capture the relative difference in the scores of the sentiment and hence average sentiment is used.

($L_3$) Average sentiment of first level replies: indicates whether people post positive or negative comments on the immediate tweets posts sharing fake and real news.

($L_4$) Average sentiment of replies in deepest cascade: Deepest cascade generally indicate the nodes that are most propagated cascade in the entire propagation network. The average sentiment of the replies in the deepest cascade capture the emotion of user comments in most influential information cascade.

($L_5$) Sentiment of first level reply in the deepest cascade: Deepest cascade generally indicate the nodes that are most propagated cascade in the entire propagation network. The sentiment of the first level reply indicates the user emotions to most influential information cascade.

The aforementioned linguistic features for micro-level propagation networks of fake news and real news were obtained from both the PolitiFact and GossipCop datasets. As shown in FIG. 23, embodiments analyze the distribution of linguistic features and provide for the following observations:

The linguistic features $L_2$, and $L_3$ are significantly different for fake news and real news in both datasets.

The average sentiment of replies ($L_2$) to fake news is lower than the average sentiment of replies to real news in both the datasets under statistic t-test. It shows that tweets related to fake news receive more negative sentiment comments over real news. A similar result is observed in the sentiment of comments posted directly to tweets captured by feature $L_3$.

B.2.4. Evaluating Propagation Features

This section discusses embodiments of the invention in addressing Q2. The discussion considers whether the hierarchical propagation network features can help improve fake news detection, and how to build effective models based on them. Moreover, embodiments perform feature importance and model robustness analysis. Embodiments first introduce how to represent the hierarchical propagation network features $f_i$ for a news item $a_i$. Let $G_i$ denote the temporal propagation network of news piece $a_i$. For $G_i$, all types of propagation features are extracted and concatenated into one feature vector fi. The proposed Hierarchical Propagation Network Feature vector $f_i$ is denoted as HPNF.

B.2.4.1. Experimental Settings

To evaluate the performance of fake news detection algorithms, embodiments use the following metrics, which are commonly used to evaluate classifiers in related areas: Accuracy (Acc), Precision (Prec), Recall (Rec), and F1. Embodiments randomly choose 80% of news pieces for training and remaining 20% for testing, and the process is performed five times and the average performance is reported. The details of baseline feature representations are given as below:

RST: RST can capture the writing style of a document by extracting the rhetorical relations systematically. It learns a transformation from a bag-of-words surface representation into a latent feature representation.

LIWC: LIWC extracts lexicons that fall into different psycholinguistic categories, and learn a feature vector through multiple measures for each document.

STFN: STFN includes the structural and temporal features proposed herein for macro-level propagation network, i.e., tree height, number of nodes, max breadth of the tree, fraction of unique users, time taken to reach depth of 1 in propagation, time taken to reach depth of 2 in propagation, number of unique users within level 1 and number of unique users within level 3 of propagation.

RST_HPNF. RST_HPNF represents the concatenated features of RST and HPNF, which includes features extracted from both news content and hierarchical propagation network.

LIWC_HPNF. LIWC_HPNF represents the concatenated features of LIWC and HPNF, which includes features extracted from both news content and hierarchical propagation network.

STNF_HPNF. STNF_HPNF represents the concatenated features of STNF and HPNF, which includes features structural and temporal features discussed in STNF and hierarchical propagation network features.

Note that for a fair and comprehensive comparison, embodiments choose the above feature extraction methods from the following aspects: (1) news content, such as RST and LIWC; and (2) propagation network, such as Structure and Temporal features for Fake News Detection (STFN). Embodiments also combine RST, LIWC and the STNF feature with HPNF to further explore if HPNF provides complementary information. For a fair comparison, embodiments use the classifier that performs best on each feature set and compare the effectiveness of these different feature representations.

B.2.4.2. Fake News Detection Performance Comparison

Embodiments were tested against the baseline features on different learning algorithms to see which one achieves the best performance (see the table in FIG. 24). The algorithms include Gaussian Naive Bayes (GNB for short), Decision Tree (DT), Logistic Regression (LR), and Random Forest (RF). The open-sourced scikit-learn machine learning framework in Python was used to implement all these algorithms. To ensure a fair comparison of the proposed features and baseline features, all the algorithms were run using default parameter settings. The experimental results are shown in the table in FIG. 24. The following observations were made:

For news content-based methods, LIWC performs better than RST. This indicates that the LIWC vocabulary can better capture the deceptiveness in news content, which reveals that fake news pieces are very different from real news in terms of word choice from psychometrics perspectives.

HPNF achieves the best performance in both datasets on most of metrics compared with all other baseline methods. This shows that the extracted features from macro-level and micro-level propagation networks can help improve fake news detection significantly.

For propagation network-based methods, HPNF performs better than STNF consistently in both datasets. This is because HPNF includes features from micro-level networks from structural, temporal and linguistic perspectives that are useful for fake news detection. STNF only encodes the features from macro-level propagation network.

In addition, it was observed that combining HPNF features with existing features can further improve the detection performances. For example, RST_HPNF performs better than either RST or HPNF, which reveals that they are extracted from orthogonal information spaces, i.e., RST features are extracted from news content and HPNF features from hierarchical propagation network on social media, and have complementary information to help fake news detection. Similar observations were made for other features, i.e., (LIWC_HPNF>LIWC, LIWC HPNF>HPNF) and (STNF_HPNF>HPNF, STNF_HPNF>STNF).

The robustness of the extracted features HPNF was further evaluated. Fake news detection performances using different classifiers of detection performance for HPNF with different learning algorithms is graphically depicted in FIG. 25. These algorithms have different learning biases, and thus their performance is often different for the same task. It is observed that: (1) RF achieves the best overall performance on both datasets; and (2) while the performance of RF is slightly better than other learning algorithms, the results are not significantly different across algorithms. This demonstrates that when sufficient information is available in the hierarchical propagation network features, the performance is not very sensitive to the choice of learning algorithms.

B.2.4.3. Feature Importance Analysis

In this subsection, the importance of the features in different granular levels is analyzed to understand how each type of features contributes to the prediction performance in fake news detection. Feature importance is analyzed in the Random Forest (RF) by computing a feature importance score based on the Gini impurity.

First, the fake news detection performance is evaluated on different levels of a hierarchical propagation network including a) Micro-level; b) Macro-level; and c) both micro-level and macro-level (All) and their contributions compared to fake news detection, as seen in the top table of FIG. 26. The following observations are made: (i) the combination of micro-level and macro-level features can achieve better performance than either micro-level or macro-level features in both datasets consistently. This shows that features from different levels provide complementary information in feature dimension and thus help fake news detection; (ii) In general, it is observed that micro-level features can achieve good performance, which demonstrates the necessitates of exploring micro-level features; (iii) compared with macro-level features, micro-level features may not always perform better. For example, features from micro-level networks perform better than features from macro-level networks in PolitiFact dataset, and vice versa for GossipCop dataset.

Next, the performance of different types of features from hierarchical propagation network is evaluated, including a) Structural; b) Temporal; c) Linguistic and d) combination of structural, temporal and linguistic (All), and their classification performance compared in the bottom table of FIG. 26. The following observations were made: i) temporal features perform better than both structural and linguistic features in both the datasets and this shows that temporal features have more importance in the classification task; ii) structural features performs better than linguistic features in both the datasets as the micro-level network have limited linguistic contents; and iii) when the features from all perspectives are considered, the classification performance is better than considering either of the three features and this shows the features have complimentary information to differentiate fake news from real news.

Figure 27:
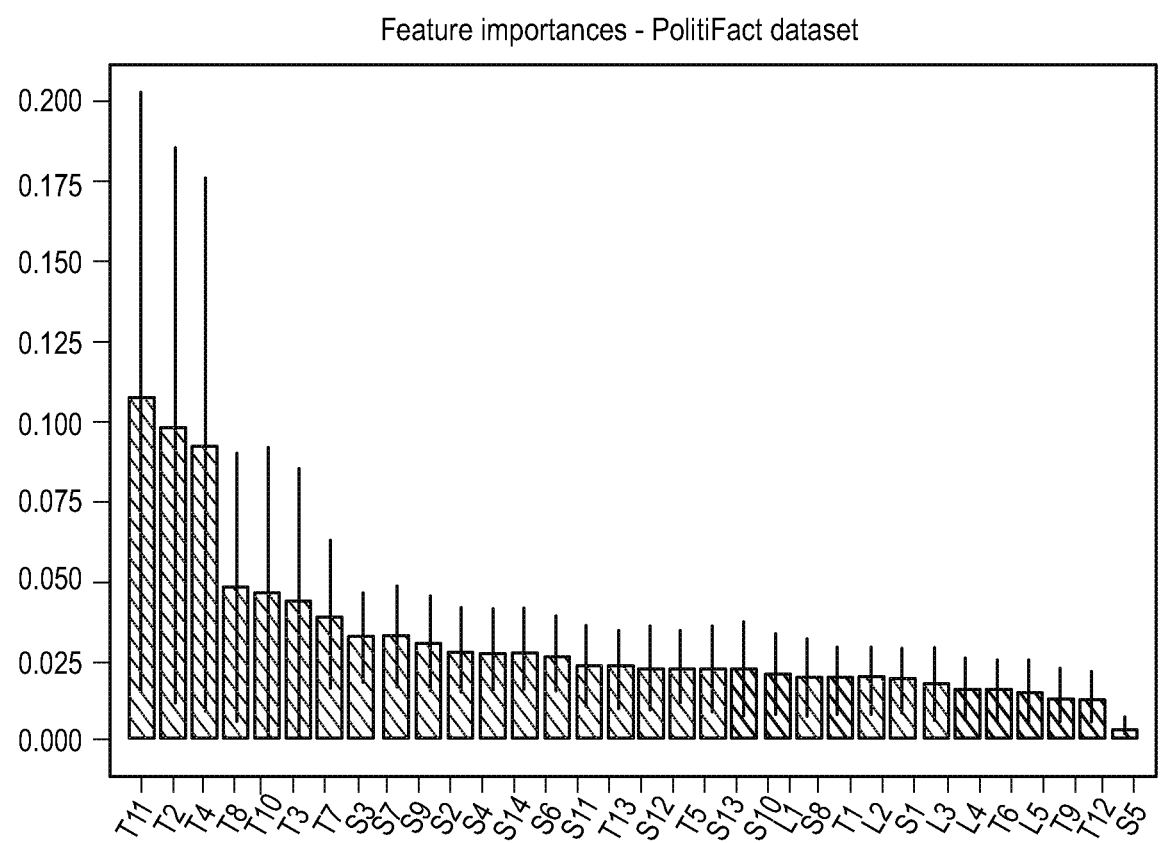
FIG. 27 indicates longevity of fake and real news in social media is different according to embodiments of the invention.
Figure 28:
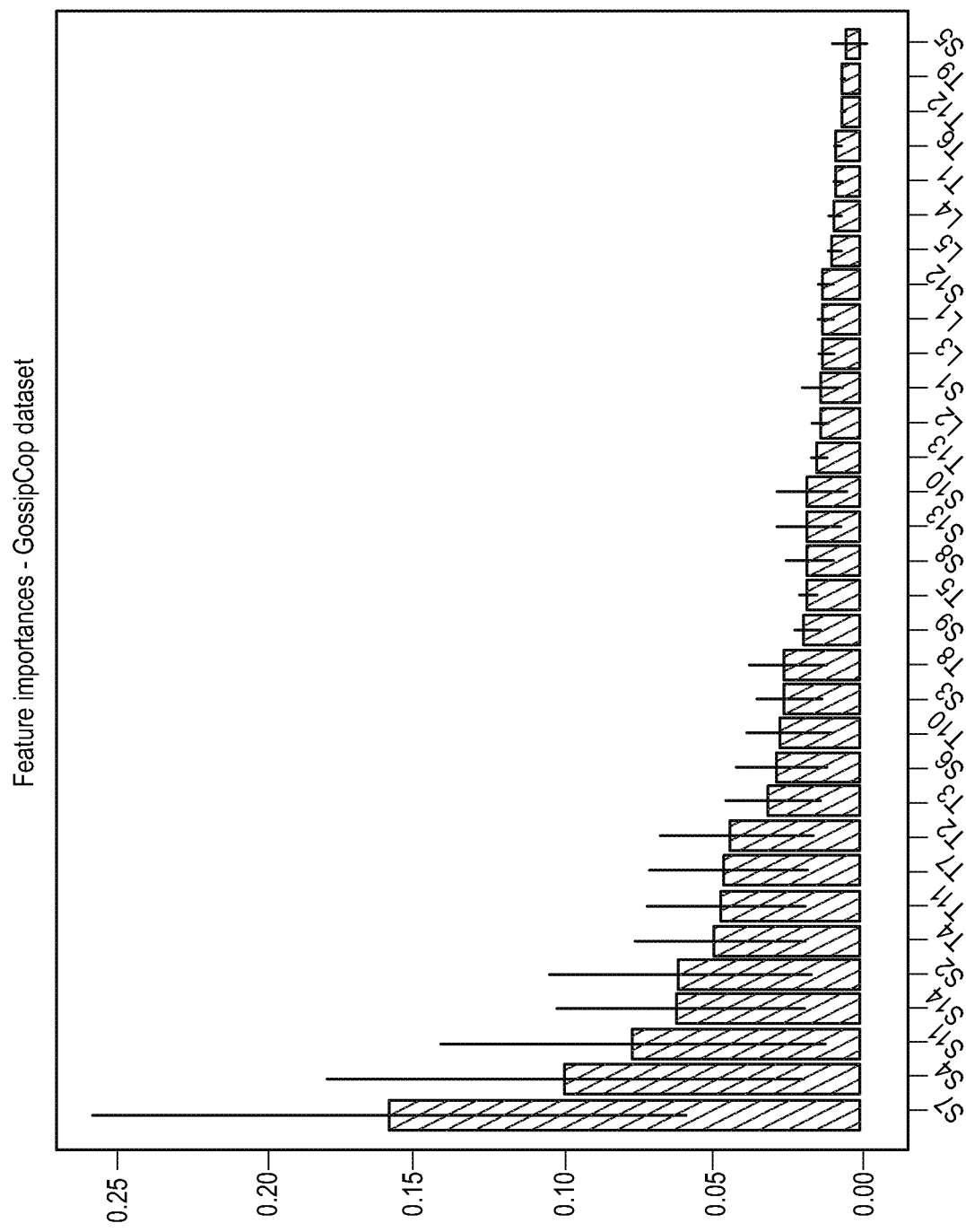
FIG. 28 demonstrates the feature importance results on a dataset according to embodiments of the invention.

From FIG. 27, it is observed that: (1) the temporal features of PolitiFact dataset have higher importance scores over the structural and linguistic features; (ii) the feature $T_{11}$ shows that lifespan of the engagements in the micro network is perhaps the most important feature in fake news classification. Similarly, the life span of news in the macro network captured by $T_2$ shows the second highest importance score. This indicates that the longevity of fake and real news in social media is different; and (iii) among structural features extracted from PolitiFact, the maximum out-degree of the macro network $S_3$ has more importance than other structural features. FIG. 28 demonstrates the feature importance results on GossipCop dataset. The following observations were made: (i) the fraction of cascades with retweets $S_7$ in the macro network has the highest importance score. This shows a difference in the scale of the spreading scope of fake and real news; (ii) in addition, the number of cascades in macro network $S_4$ has the second highest importance score; and (iii) the time difference between the first and last tweet posting news $T_4$ has higher importance score among temporal features. This confirms the findings that fake news tends to spread in a short period of time on social media than real news, and this actually serves an important feature for fake news detection.

C. Visualizing Fake News

Embodiments of the invention provide a web-based visualization for analyzing the collected dataset as well as visualizing the features of the dataset. Embodiments visualize the trends of fake news, e.g., fake tweets versus real tweets over time from the dataset. Word cloud visualization allows for seeing the topics of fake news and real news. Verified users visualization allows for comparing how verified and unverified users spread fake news. A social media network explorer enables visualizing the social media network of users who spread fake news and real news. A geolocation tab allows for identifying the geographical distribution of the users who spread fake news and real news. Also, the user interface (UI) allows one to compare the effectiveness of the features used for the model. All the features mentioned above may be combined in an embodiment to provide a complete end-to-end system for collecting, detecting, and visualizing fake news.

Figure 29:
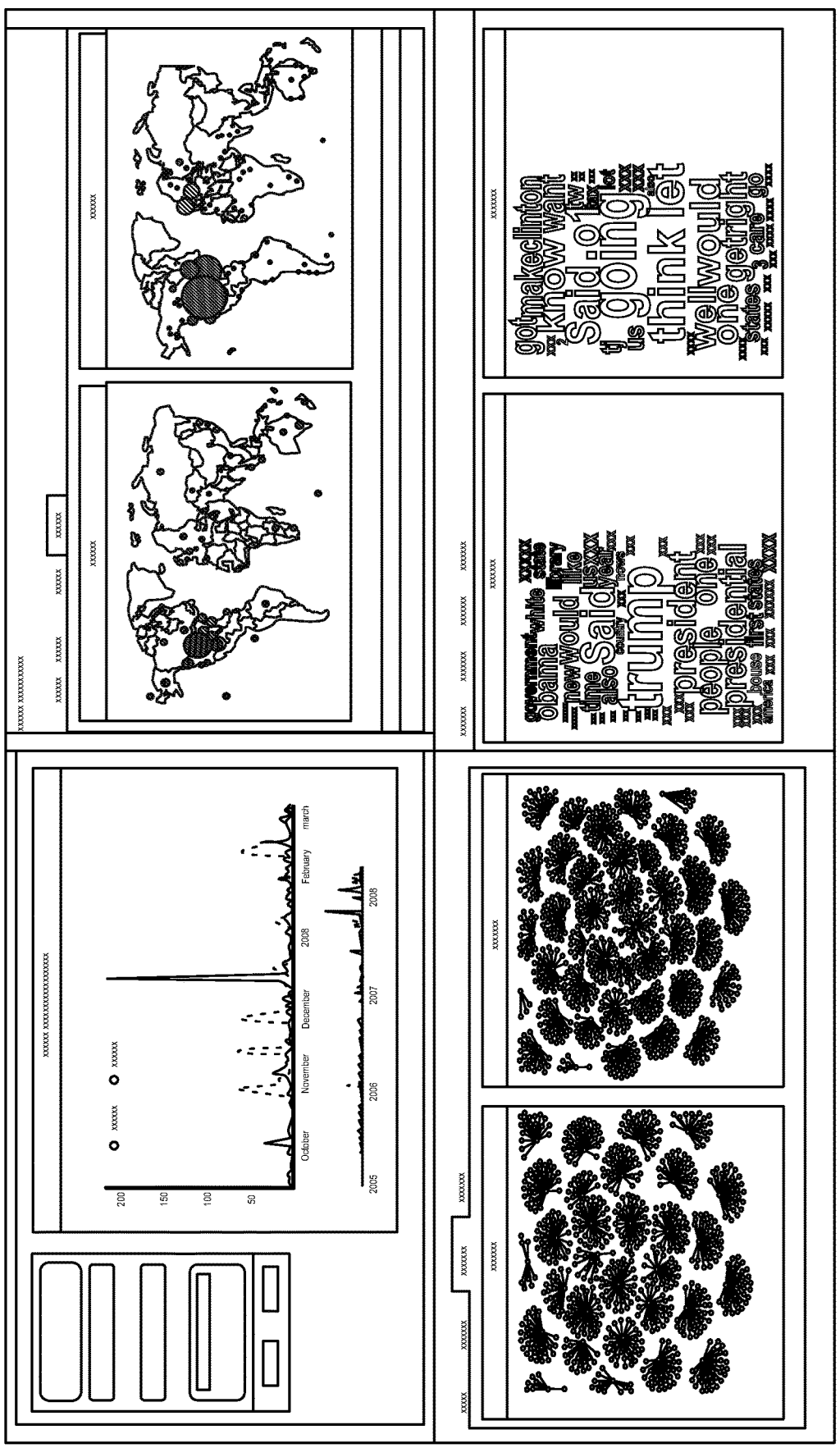
FIG. 29 illustrates a fake news tracking visualization user interface according to embodiments of the invention.
Figure 30:
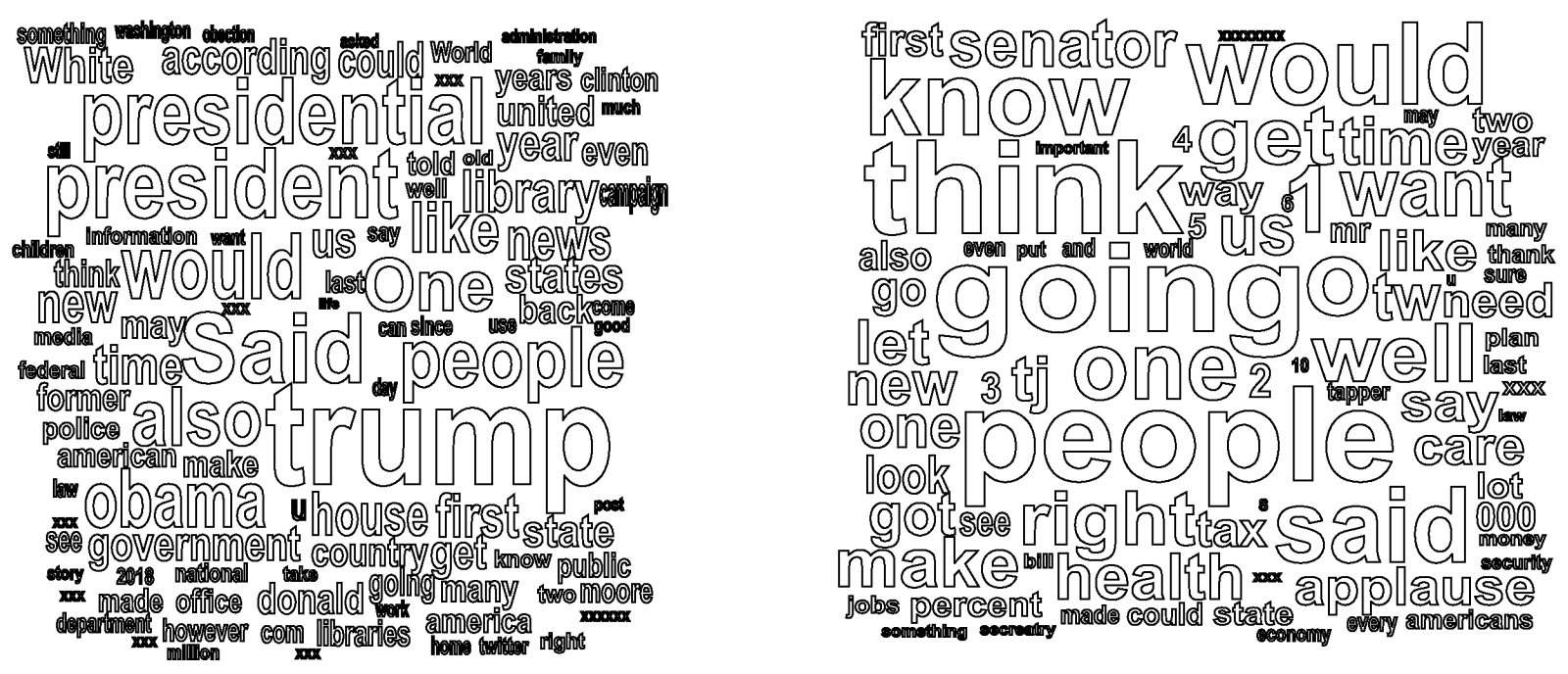

Embodiments of the invention provide for fake news visualization as shown in FIG. 29 to develop insights on the data. Embodiments of the invention provide various interfaces for visualizing the data from a dataset. For identifying the differences in the news content of the true news and the fake news, embodiments of the invention use a word cloud representation of the words for the textual data, as illustrated in FIG. 30. With reference to FIG. 29, embodiments of the invention search for fake news within a time frame and identify the relevant data. Also, embodiments of the invention provide the comparison of feature significance and model performance as part of the dashboard.

Using geo-located fake tweets as shown in FIG. 31, embodiments of the invention identify how fake news is spread around certain areas of United States as the news pieces collected were mostly related to US politics. Using the network of the users as shown in FIG. 32, embodiments of the invention visualize the social media network to identify the differences between the users who interact with the fake news and the true news. Using these visualizations, embodiments of the invention see differences between the user characteristics such as the social media network and geolocation.

Figure 33:
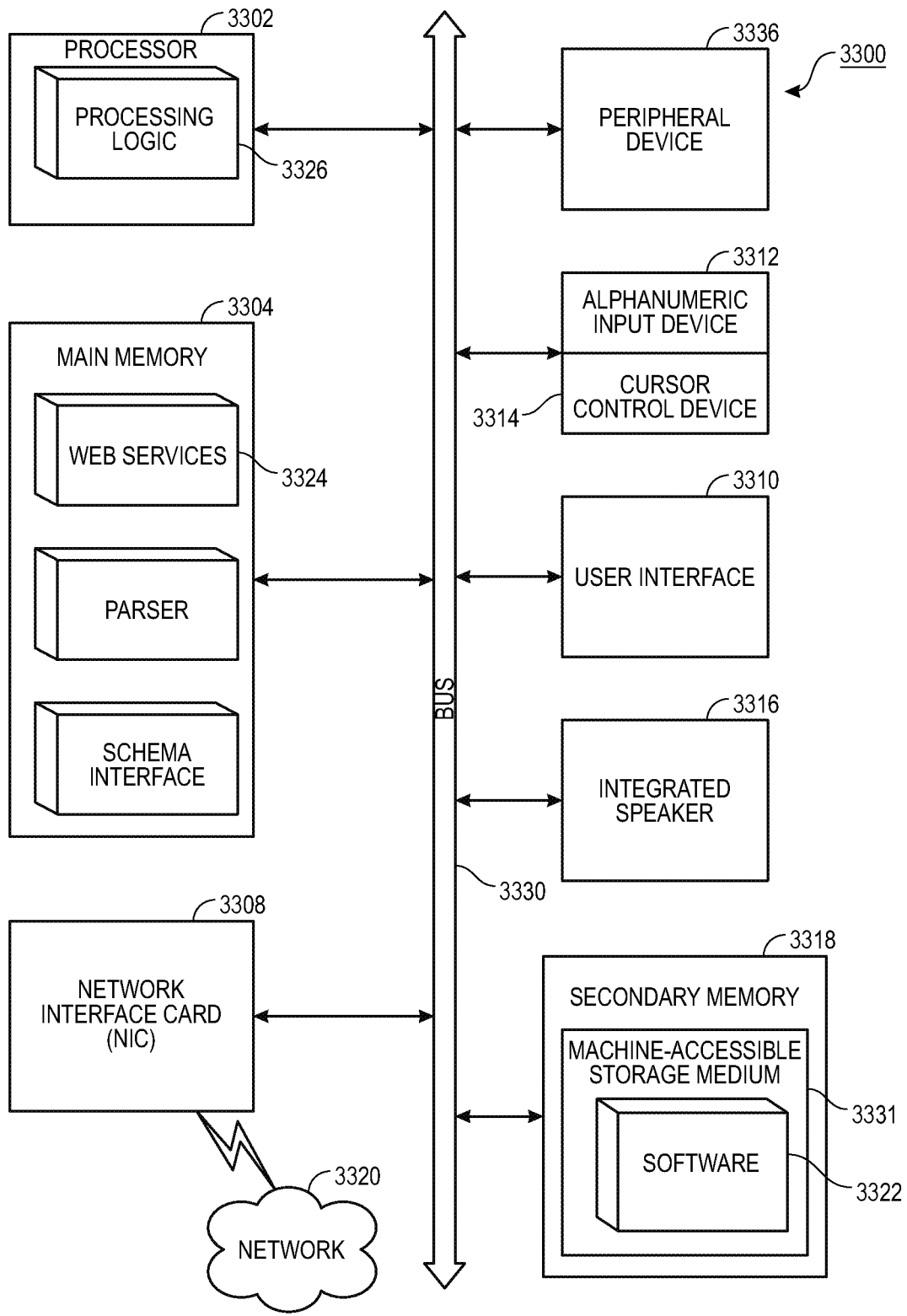
FIG. 33 illustrates a diagrammatic representation of a machine 3300 in the exemplary form of a computer system, in accordance with one embodiment, within which a set of instructions, for causing the machine 3300 to perform any one or more of the methodologies discussed herein, may be executed.

II. Illustrative Computing Environment in Accordance with Certain Embodiments FIG. 33 illustrates a diagrammatic representation of a machine 3300 in the exemplary form of a computer system, in accordance with one embodiment, within which a set of instructions, for causing the machine 3300 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer to peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 3300 includes a processor 3302, a main memory 3304 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 3318, which communicate with each other via a bus 3330. Main memory 3304 includes information and instructions and software program components necessary for performing and executing the functions with respect to the various embodiments of the systems, methods for implementing embodiments of the invention described herein. Instructions may be stored within main memory 3304. Main memory 3304 and its sub-elements are operable in conjunction with processing logic 3326 and/or software 3322 and processor 3302 to perform the methodologies discussed herein.

Processor 3302 represents one or more devices such as a microprocessor, central processing unit, or the like. More particularly, the processor 3302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 3302 may also be one or more devices such as an application specific integrated circuit (ASIC), a field programmable gate array (FPGA), a digital signal processor (DSP), network processor, or the like. Processor 3302 is configured to execute the processing logic 3326 for performing the operations and functionality which are discussed herein.

The computer system 3300 may further include one or more network interface cards 3308 to interface with the computer system 3300 with one or more networks 3320. The computer system 3300 also may include a user interface 3310 (such as a video display unit, a liquid crystal display (LCD), or a cathode ray tube (CRT)), an alphanumeric input device 3312 (e.g., a keyboard), a cursor control device 3314 (e.g., a mouse), and a signal generation device 3316 (e.g., an integrated speaker). The computer system 3300 may further include peripheral device 3336 (e.g., wireless or wired communication devices, memory devices, storage devices, audio processing devices, video processing devices, etc.).

The secondary memory 3318 may include a non-transitory machine-readable storage medium (or more specifically a non-transitory machine-accessible storage medium) 3331 on which is stored one or more sets of instructions (e.g., software 3322) embodying any one or more of the methodologies or functions described herein. Software 3322 may also reside, or alternatively reside within main memory 3304, and may further reside completely or at least partially within the processor 3302 during execution thereof by the computer system 3300, the main memory 3304 and the processor 3302 also constituting machine-readable storage media. The software 3322 may further be transmitted or received over a network 3320 via the network interface card 3308.

Some portions of this detailed description are presented in terms of algorithms and representations of operations on data within a computer memory. These algorithmic descriptions and representations are the means used by those skilled in the data processing arts to most effectively convey the substance of their work to others skilled in the art. An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system or computing platform, or similar electronic computing device(s), that manipulates and transforms data represented as physical (electronic) quantities within the computer system's registers and memories into other data similarly represented as physical quantities within the computer system memories or registers or other such information storage, transmission or display devices.

In addition to various hardware components depicted in the figures and described herein, embodiments further include various operations which are described below. The operations described in accordance with such embodiments may be performed by hardware components or may be embodied in machine-executable instructions, which may be used to cause a processor programmed with the instructions to perform the operations. Alternatively, the operations may be performed by a combination of hardware and software, including software instructions that perform the operations described herein via memory and one or more processors of a computing platform.

Embodiments of invention also relate to apparatuses for performing the operations herein. Some apparatuses may be specially constructed for the required purposes, or selectively activated or configured by a computer program stored in one or more computers. Such a computer program may be stored in a computer readable storage medium, such as, but not limited to, any type of disk including optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms presented herein are not inherently related to any particular computer or other apparatus. In addition, embodiments of the invention are not described with reference to any particular programming language. It will be appreciated that a variety of programming languages may be used to implement the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices, etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. A method of detecting fake news, comprising:
    receiving a plurality of online news articles including both fake online news articles and real online news articles;
    creating a hierarchical macro-level propagation network of the fake online news and real online news articles, the hierarchical macro-level propagation network comprising news nodes, social media post nodes, and social media repost nodes;
    creating a hierarchical micro-level propagation network of the fake online news and real online news articles, the hierarchical micro-level propagation network comprising reply nodes;
    analyzing structural and temporal features of the hierarchical macro-level propagation network;
    analyzing structural, temporal, and linguistic features of the hierarchical micro-level propagation network by executing a trained AI model to generate a predictive sentiment score from the linguistic features analyzed for user replies represented within the reply nodes of the hierarchical micro-level propagation network;
    identifying the user replies as having one of (i) positive sentiment, (ii) neutral sentiment, or (iii) negative sentiment based on the predictive sentiment scores generated for the user replies;
    calculating a ratio of neutral sentiment over combined neutral sentiment and positive sentiment for the plurality of online news articles from the user replies;
    calculating a ratio of negative sentiment over positive sentiment for the plurality of online news articles from the user replies;
    classifying one of the plurality of online news articles as a fake news article when (i) the ratio of negative sentiment over positive sentiment of the user replies for the respective online news article classified as the fake news article is calculated to be highest among the plurality of online news articles and (ii) when the ratio of neutral sentiment over a combined neutral sentiment and positive sentiment of the user replies for the respective online news article classified as the fake news article is calculated to be lowest among the plurality of online news articles; and
    identifying fake news in the plurality of online news articles based on the analysis of the structural and temporal features of both the hierarchical macro-level and hierarchical micro-level propagation networks and based further on the analysis of the linguistic features of the user replies in the hierarchical micro-level propagation network used to classify the fake news article amongst the plurality of online news articles.

2. The method of claim 1, wherein analyzing the structural and temporal features of the hierarchical macro-level propagation network comprises analyzing a depth of, a width of, and number of social media bots in, the hierarchical macro-level propagation network.

3. The method of claim 2, wherein analyzing the structural, temporal, and linguistic features of the hierarchical micro-level propagation network comprises analyzing sentiment polarities associated with reply nodes in the hierarchical micro-level propagation network.

4. The method of claim 3, wherein identifying fake news in the plurality of online news articles based on the analysis of the structural and temporal features of the hierarchical macro-level propagation network and the analysis of the structural, temporal, and linguistic features of hierarchical micro-level propagation network comprises identifying fake news in the plurality of online news articles based on the analysis of the depth of, a width of, and number of social media bots in, the hierarchical macro-level propagation network, and on the analysis of the sentiment polarities associated with reply nodes in the hierarchical micro-level propagation network.

5. Non-transitory computer readable storage media having instructions stored thereon that, when executed by a processor of a system, cause the system to detect fake news, comprising:
    receiving a plurality of online news articles including both fake online news articles and real online news articles;
    creating a hierarchical macro-level propagation network of the fake online news and real online news articles, the hierarchical macro-level propagation network comprising news nodes, social media post nodes, and social media repost nodes;
    creating a hierarchical micro-level propagation network of the fake online news and real online news articles, the hierarchical micro-level propagation network comprising reply nodes;
    analyzing structural and temporal features of the hierarchical macro-level propagation network;
    analyzing structural, temporal, and linguistic features of the hierarchical micro-level propagation network by executing a trained AI model to generate a predictive sentiment score from the linguistic features analyzed for user replies represented within the reply nodes of the hierarchical micro-level propagation network;
    identifying the user replies as having one of (i) positive sentiment, (ii) neutral sentiment, or (iii) negative sentiment based on the predictive sentiment scores generated for the user replies;
    calculating a ratio of neutral sentiment over combined neutral sentiment and positive sentiment for the plurality of online news articles from the user replies;

calculating a ratio of negative sentiment over positive sentiment for the plurality of online news articles from the user replies;

classifying one of the plurality of online news articles as a fake news article when (i) the ratio of negative sentiment over positive sentiment of the user replies for the respective online news article classified as the fake news article is calculated to be highest among the plurality of online news articles and (ii) when the ratio of neutral sentiment over a combined neutral sentiment and positive sentiment of the user replies for the respective online news article classified as the fake news article is calculated to be lowest among the plurality of online news articles; and identifying fake news in the plurality of online news articles based on the analysis of the structural and temporal features of both the hierarchical macro-level and hierarchical micro-level propagation networks and based further on the analysis of the linguistic features of the user replies in the hierarchical micro-level propagation network used to classify the fake news article amongst the plurality of online news articles.

6. The non-transitory computer readable storage media of claim 5, wherein analyzing the structural and temporal features of the hierarchical macro-level propagation network comprises analyzing a depth of, a width of, and number of social media bots in, the hierarchical macro-level propagation network.

7. The non-transitory computer readable storage media of claim 6, wherein analyzing the structural, temporal, and linguistic features of the hierarchical micro-level propagation network comprises analyzing sentiment polarities associated with reply nodes in the hierarchical micro-level propagation network.

8. The non-transitory computer readable storage media of claim 7, wherein identifying fake news in the plurality of online news articles based on the analysis of the structural and temporal features of the hierarchical macro-level propagation network and the analysis of the structural, temporal, and linguistic features of the hierarchical micro-level propagation network comprises identifying fake news in the plurality of online news articles based on the analysis of the depth of, a width of, and number of social media bots in, the hierarchical macro-level propagation network, and on the analysis of the sentiment polarities associated with reply nodes in the hierarchical micro-level propagation network.

9. A system comprising:
a memory to store instructions;
a set of one or more processors to execute instructions;
a non-transitory machine-readable storage medium that provides instructions that, when executed by the set of one or more processors, the instructions stored in the memory are configurable to cause the system to perform operations comprising:
receiving a plurality of online news articles including both fake online news articles and real online news articles;
creating a hierarchical macro-level propagation network of the fake online news and real online news articles, the hierarchical macro-level propagation network comprising news nodes, social media post nodes, and social media repost nodes;
creating a hierarchical micro-level propagation network of the fake online news and real online news articles, the hierarchical micro-level propagation network comprising reply nodes;
analyzing structural and temporal features of the hierarchical macro-level propagation network;
analyzing structural, temporal, and linguistic features of the hierarchical micro-level propagation network by executing a trained AI model to generate a predictive sentiment score from the linguistic features analyzed for user replies represented within the reply nodes of the hierarchical micro-level propagation network;
identifying the user replies as having one of (i) positive sentiment, (ii) neutral sentiment, or (iii) negative sentiment based on the predictive sentiment scores generated for the user replies;
calculating a ratio of neutral sentiment over combined neutral sentiment and positive sentiment for the plurality of online news articles from the user replies;
calculating a ratio of negative sentiment over positive sentiment for the plurality of online news articles from the user replies;
classifying one of the plurality of online news articles as a fake news article when (i) the ratio of negative sentiment over positive sentiment of the user replies for the respective online news article classified as the fake news article is calculated to be highest among the plurality of online news articles and (ii) when the ratio of neutral sentiment over a combined neutral sentiment and positive sentiment of the user replies for the respective online news article classified as the fake news article is calculated to be lowest among the plurality of online news articles; and
identifying fake news in the plurality of online news articles based on the analysis of the structural and temporal features of both the hierarchical macro-level and hierarchical micro-level propagation networks and based further on the analysis of the linguistic features of the user replies in the hierarchical micro-level propagation network used to classify the fake news article amongst the plurality of online news articles.

10. The system of claim 9:
wherein analyzing the structural and temporal features of the hierarchical macro-level propagation network further comprises analyzing a depth of, a width of, and number of social media bots in, the hierarchical macro-level propagation network.

11. The system of claim 9:
wherein analyzing the structural, temporal, and linguistic features of the hierarchical micro-level propagation network further comprises analyzing sentiment polarities associated with reply nodes in the hierarchical micro-level propagation network.

12. The system of claim 10:
wherein identifying fake news in the plurality of online news articles further comprises identifying fake news in the plurality of online news articles based on the analysis of the depth of, a width of, and number of social media bots in, the hierarchical macro-level propagation network, and on the analysis of the sentiment polarities associated with reply nodes in the hierarchical micro-level propagation network.

13. The method of claim 1, wherein identifying fake news in the plurality of online news articles further comprises:
comparing a creation time of social media user profiles with a current date; and
checking whether the social media user profiles are created by a social media bot.

14. The non-transitory computer readable storage media of claim 5, wherein identifying fake news in the plurality of online news articles further comprises:
comparing a creation time of social media user profiles with a current date; and checking whether the social media user profiles are created by a social media bot.

15. The system of claim 9, wherein identifying fake news in the plurality of online news articles further comprises:
comparing a creation time of social media user profiles with a current date; and
checking whether the social media user profiles are created by a social media bot.

16. The method of claim 1:
wherein the method further comprises analyzing a distribution of geo-locations of social media users that create the posts on social media relating to the published plurality of online news articles; and
wherein identifying fake news in the plurality of online news articles is further based on the analysis of the distribution of geo-locations of the social media users that create the posts on social media relating to the published plurality of online news articles.

17. The non-transitory computer readable storage media of claim 5:
wherein the instructions cause the system to perform operations further comprising analyzing a distribution of geo-locations of social media users that create the posts on social media relating to the published plurality of online news articles; and
wherein identifying fake news in the plurality of online news articles is further based on the analysis of the distribution of geo-locations of the social media users that create the posts on social media relating to the published plurality of online news articles.

18. The system of claim 9:
wherein the instructions cause the system to perform operations further comprising analyzing a distribution of geo-locations of social media users that create the posts on social media relating to the published plurality of online news articles; and
wherein identifying fake news in the plurality of online news articles is further based on the analysis of the distribution of geo-locations of the social media users that create the posts on social media relating to the published plurality of online news articles.

19. The method of claim 1:
wherein the method further comprises obtaining a follower count and a followees count of social media users that create posts on social media relating to the published plurality of online news articles; and
wherein identifying fake news in the plurality of online news articles is further based on the follower count and the followees count of the social media users that create the posts on social media relating to the published plurality of online news articles.

20. The non-transitory computer readable storage media of claim 5:
wherein the instructions cause the system to perform operations further comprising obtaining a follower count and a followees count of social media users that create posts on social media relating to the published plurality of online news articles; and
wherein identifying fake news in the plurality of online news articles is further based on the follower count and the followees count of the social media users that create the posts on social media relating to the published plurality of online news articles.

21. The system of claim 9:
wherein the instructions cause the system to perform operations further comprising obtaining a follower count and a followees count of social media users that create posts on social media relating to the published plurality of online news articles; and
wherein identifying fake news in the plurality of online news articles is further based on the follower count and the followees count of the social media users that create the posts on social media relating to the published plurality of online news articles.

* * * * *